US007373368B1

(12) United States Patent
Rarick et al.

(10) Patent No.: US 7,373,368 B1
(45) Date of Patent: May 13, 2008

(54) MULTIPLY EXECUTION UNIT THAT INCLUDES 4:2 AND/OR 5:3 COMPRESSORS FOR PERFORMING INTEGER AND XOR MULTIPLICATION

(75) Inventors: Leonard D. Rarick, Los Altos, CA (US); Shu-Chin Tai, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 853 days.

(21) Appl. No.: 10/891,978

(22) Filed: Jul. 15, 2004

Related U.S. Application Data

(63) Continuation-in-part of application No. 10/354,354, filed on Jan. 30, 2003, now Pat. No. 7,139,787.

(51) Int. Cl.
*G06F 7/52* (2006.01)
(52) U.S. Cl. ..................................... 708/492; 708/629
(58) Field of Classification Search ................ 708/492, 708/629, 491, 620, 625
See application file for complete search history.

(56) References Cited

U.S. PATENT DOCUMENTS 5,944,776 A    8/1999  Zhang et al. ............... 708/625
6,349,318 B1*  2/2002  Vanstone et al. ........... 708/492
6,434,586 B1   8/2002  Carlson et al. ............. 708/625

OTHER PUBLICATIONS

U.S. Appl. No. 10/354,354, filed Jan. 30, 2003, Rarick et al.
U.S. Appl. No. 10/317,752, filed Dec. 12, 2002, Spracklen et al.
Satoh and Takano, A Scalable Dual-Field Elliptic Curve Cryptographic Processor, Apr. 2003, IEEE Transactions on Computers, vol. 52, No. 4.

* cited by examiner

*Primary Examiner*—Chuong D Ngo
(74) *Attorney, Agent, or Firm*—Park, Vaughan & Fleming LLP

(57) ABSTRACT

A multiply execution unit that can generate the integer product of a multiplicand and a multiplier and is also operable to generate the XOR product of the multiplicand and the multiplier. The multiply execution unit includes a summing circuit for summing a plurality of partial products. The summing circuit includes a plurality of rows. The summing circuit can generate an integer sum of the plurality of partial products and can generate an XOR sum of the plurality of partial products. The summing circuit includes a plurality of compressors in the first row of the summing circuit. The plurality of compressors each has more than three inputs that receive data, a carry output, and a sum output.

31 Claims, 24 Drawing Sheets

MULTIPLY EXECUTION UNIT THAT INCLUDES 4:2 AND/OR 5:3 COMPRESSORS FOR PERFORMING INTEGER AND XOR MULTIPLICATION

This application is a continuation-in-part of patent application Ser. No. 10/354,354, filed on Jan. 30, 2003, now U.S. Pat. No. 7,139,787 the disclosure of which is incorporated herein by reference.

1. FIELD OF THE INVENTION

The present invention relates to multiply execution units. In particular, the invention relates to multiply execution units that can perform integer multiplication and XOR multiplication. Such integer execution units may optionally utilize Booth encoding.

2. BACKGROUND

Figure 1A:
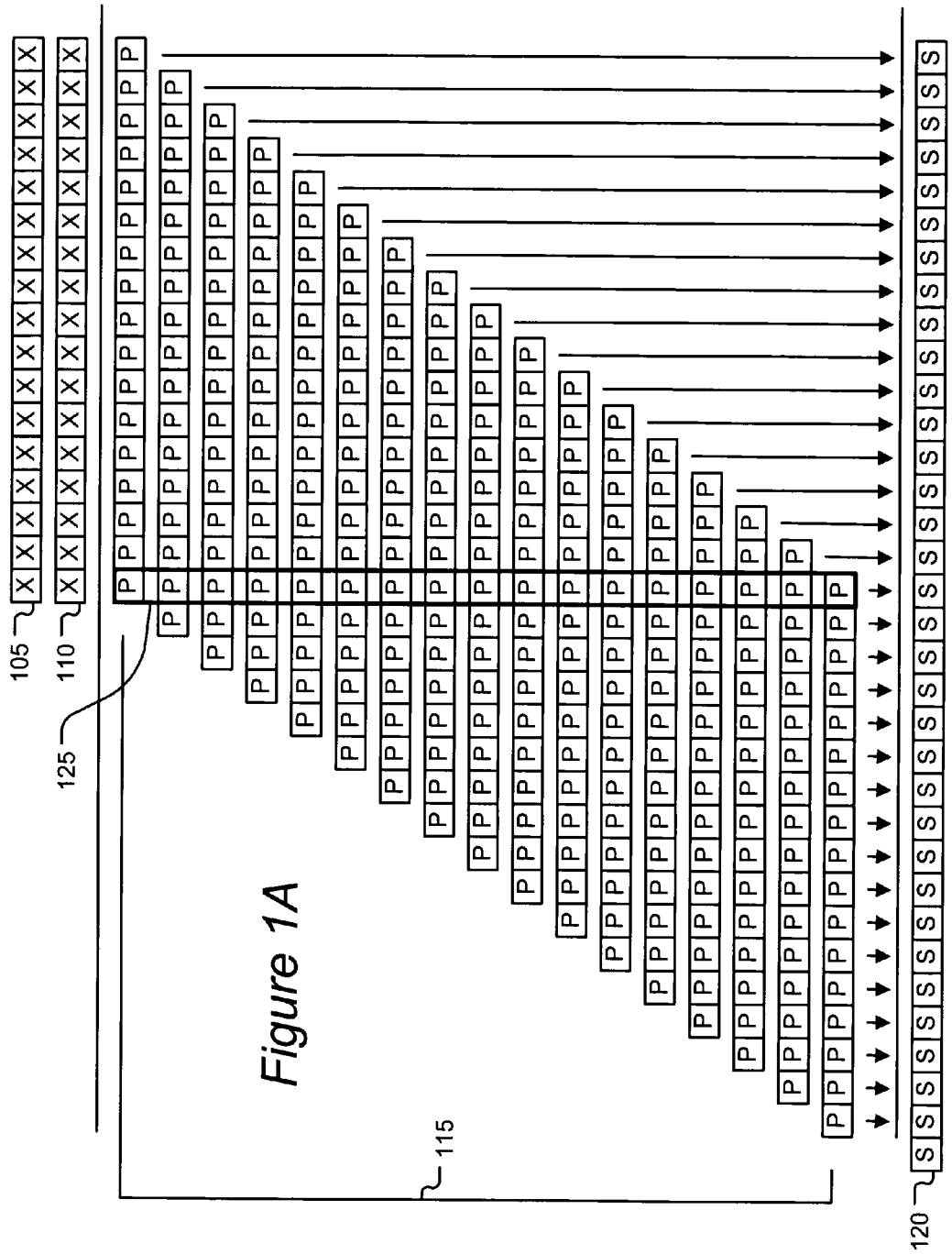
Figure 1B:
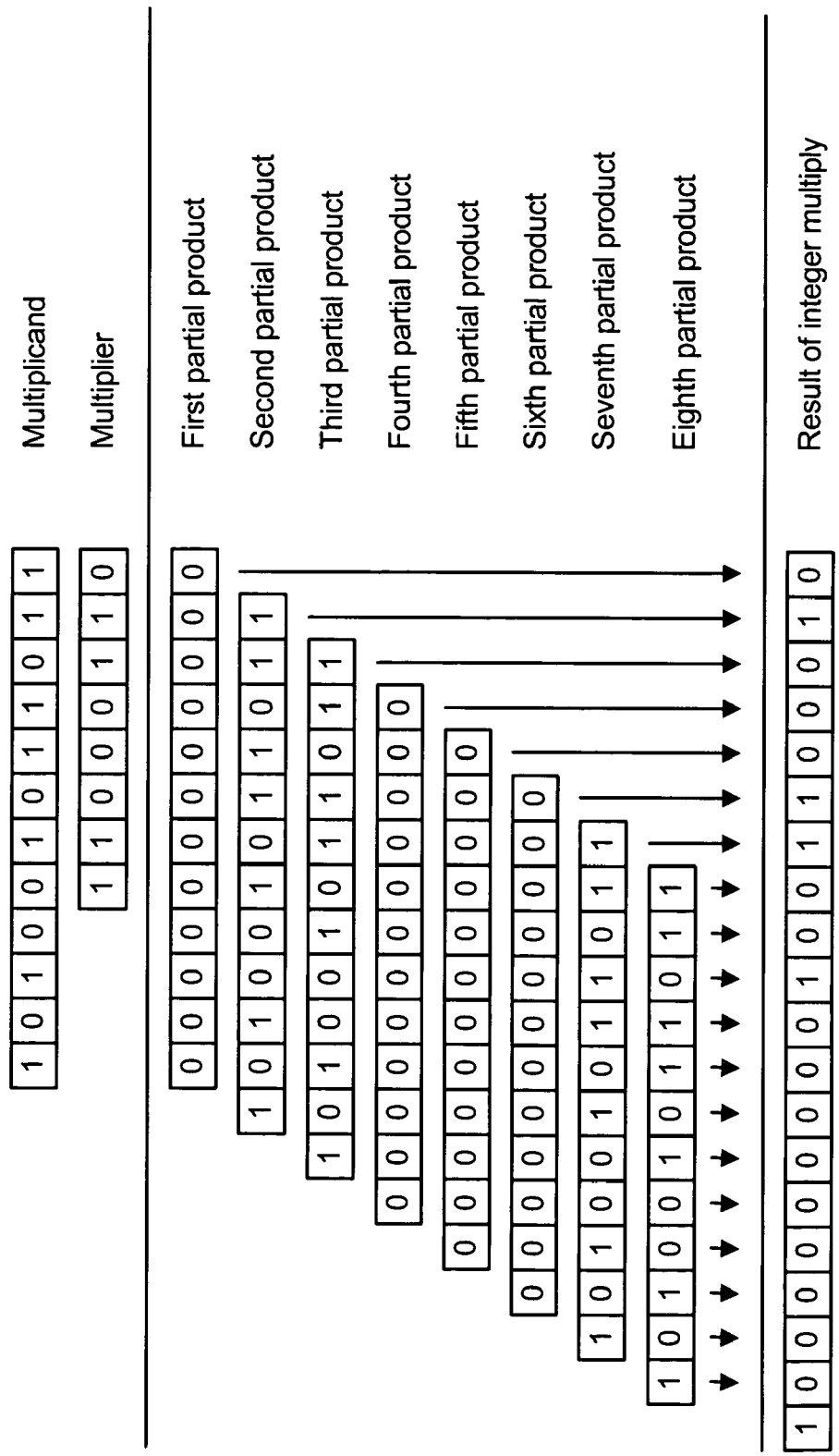

Many techniques for multiplying operands in computer systems have been utilized. One technique of multiplying two operands (one a multiplicand 105 and the other a multiplier 110) is shown in FIG. 1A. Each bit in the multiplicand 105 and the multiplier 110 is represented by an "X." As shown in FIG. 1A, the product of two 17-bit binary operands can be obtained by summing all the rows in the partial products 115. Each bit in the partial products 115 is represented by a "P." Each row of the partial products 115 is obtained by separately multiplying ("ANDing") each bit of the multiplier 110 by all the bits in the multiplicand 105. This step is repeated with each bit of the multiplier 110. As each partial product is obtained, the partial product is offset one bit to the left from the preceding partial product. After the partial products 115 are obtained, as shown in FIG. 1A, they are summed to generate the final product 120. An "S" represents each bit in the final product 120. This multiplication technique is known as longhand multiplication. A numeric example of the longhand multiplication of an 8-bit multiplier and a 12-bit multiplicand is shown in FIG. 1B. As shown in FIG. 1B, each row of the partial products is either a copy of the multiplicand or is zero.

The generation of the partial products can be rapidly performed by an execution unit within a computer system because the partial products can be generated in parallel. However, summing the partial products may be relatively slow.

Figure 2:
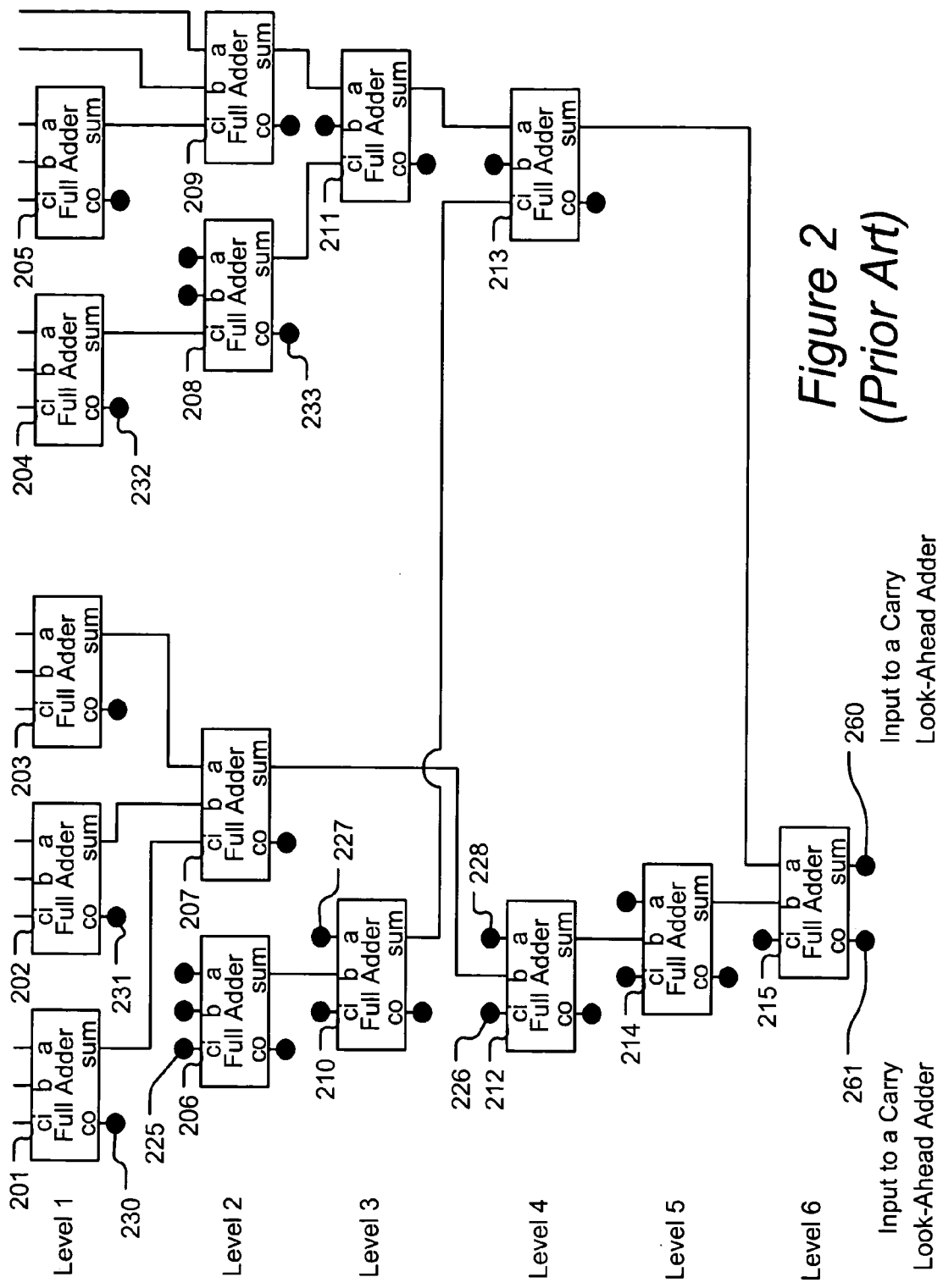
Figure 3:
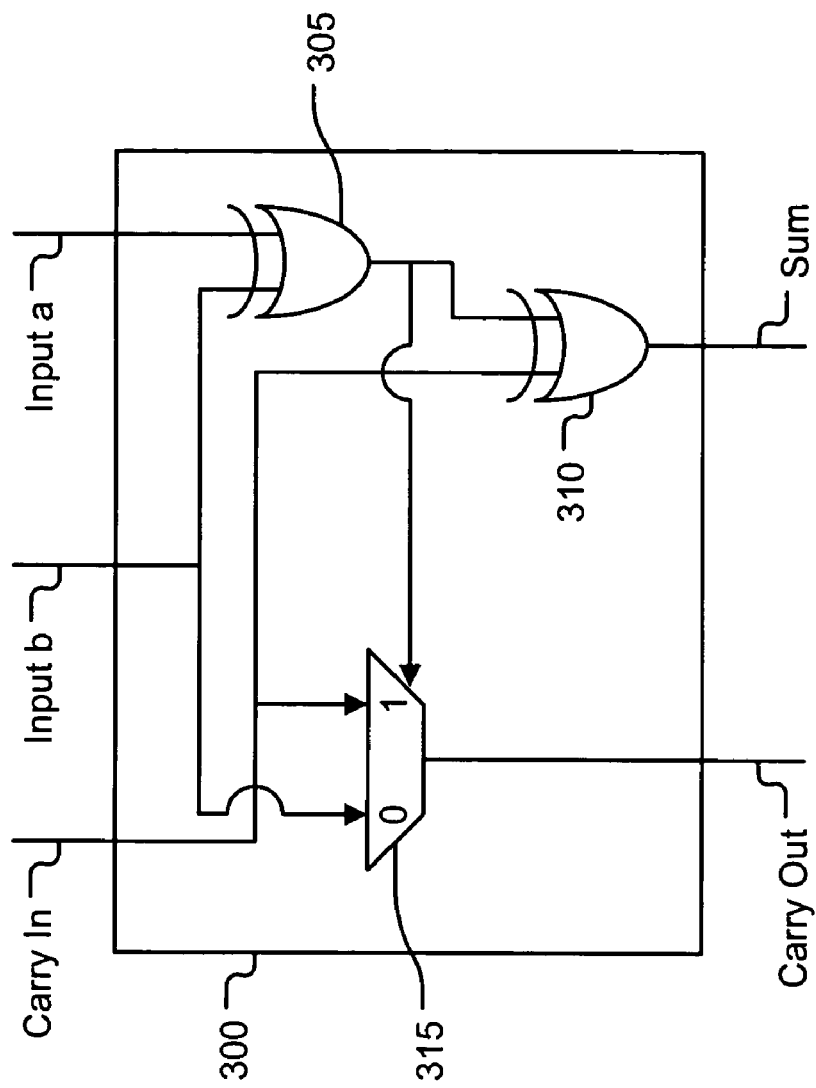

As a result, some multiply execution units utilize a carry save adder to rapidly sum partial products. FIG. 2 presents a carry save adder column that can sum the seventeen partial product bits of column 125 (FIG. 1A). Various terms, such as Wallace tree and Dadda tree, are utilized by those of skill in the art for a carry save adder column. The carry save adder column of FIG. 2 includes fifteen full adders 201-215 that are configured into six levels. As shown in FIG. 3, full adder 300 has three inputs: Carry In, Input A, and Input B. In addition, the full adder 300 has two outputs: Carry Out and Sum. While there are many methods of constructing full adders, the full adder 300 includes a first XOR gate 305, a second XOR gate 310, and a multiplexer 315. Full adders are known by those of skill in the art.

The carry save adder column shown in FIG. 2 utilizes full adders 201-215 to rapidly sum the 17 partial product bits of column 125. This carry save adder column receives the 17 partial product bits at the input "branches" of the carry save adder column via full adders 201-205 and 209. The 17 partial product bits are reduced to just two bits 260 and 261, which are input into a carry look-ahead adder (not shown) at the output of the carry save adder column. The carry save adder column receives carry bits from other carry save adder columns via nodes, such as nodes 225, 226, 227, and 228. Similarly, the carry save adder column outputs carry bits to other carry save adder columns via nodes, such as nodes 230, 231, 232, and 233. Carry save adders and carry look-ahead adders are known by those of skill in the art.

As is known in the art, fast integer multipliers can be constructed that utilize carry save adders, which include full adders, 4 to 2 compressors, and 5 to 3 compressors. These multipliers can rapidly multiply operands.

As discussed above, a significant amount of the time required to multiply two values is utilized to add the partial products. Thus, if there are fewer partial products, then multiplication can be performed more rapidly. One method of reducing the number of partial products is known as Booth encoding. Booth encoding can reduce the number of partial products almost in half. As shown in the following table, Booth encoding generates a partial product for each pair of multiplier bits instead of a partial product for each bit in the multiplier. For example, as shown in the table below, if the first pair of multiplier bits are "00," then the first partial product would be zero. Similarly, if the third and fourth bits of the multiplier were "01," then the second partial product would be equal to the multiplicand.

| 2 Bits | Partial Product Value |
| --- | --- |
| 00 | 0 |
| 01 | 1 * multiplicand |
| 10 | 2 * multiplicand (multiplicand, left-shifted 1 bit) |
| 11 | 3 * multiplicand (sum of multiplicand and multiplicand, left-shifted 1 bit) |

The generation of the values 0* multiplicand, 1* multiplicand, and 2* multiplicand can be rapidly performed by a multiplexer. However, rapid generation of the value 3* multiplicand is more difficult because an addition, which takes a significant amount of time, needs to be performed. As a result, some fast multiply execution units represent the value of 3* multiplicand as 4* multiplicand −1* multiplicand, with the −1* multiplicand value being used with the current two bits and the 4* multiplicand being used with the next two bits as an extra value of 1* multiplicand. However, if the next two bits have a value of 2* multiplicand, then an extra 1* multiplicand will result in a value of 3* multiplicand, with the same difficulty. Thus, such fast multiply execution units may represent the value of 2* multiplicand as 4* multiplicand −2* multiplicand, with the −2* multiplicand value being used with the current two bits and the 4* multiplicand value being used with the next two bits as an extra value of 1* multiplicand. As shown in the following table, such fast multiply execution units, in addition to considering the two bits of the multiplier, also consider the most significant bit of the previous two bits.

| 2 Bits | MSB of Previous Two Bits | Partial Product Value |
| --- | --- | --- |
| 00 | 0 | 0 |
| 00 | 1 | +1 * multiplicand |
| 01 | 0 | +1 * multiplicand |
| 01 | 1 | +2 * multiplicand |

-continued

| 2 Bits | MSB of Previous Two Bits | Partial Product Value |
|---|---|---|
| 10 | 0 | −2 * multiplicand (complement the multiplicand, left-shifted 1 bit) |
| 10 | 1 | −1 * multiplicand (complement the multiplicand) |
| 11 | 0 | −1 * multiplicand |
| 11 | 1 | 0 |

Figure 4:
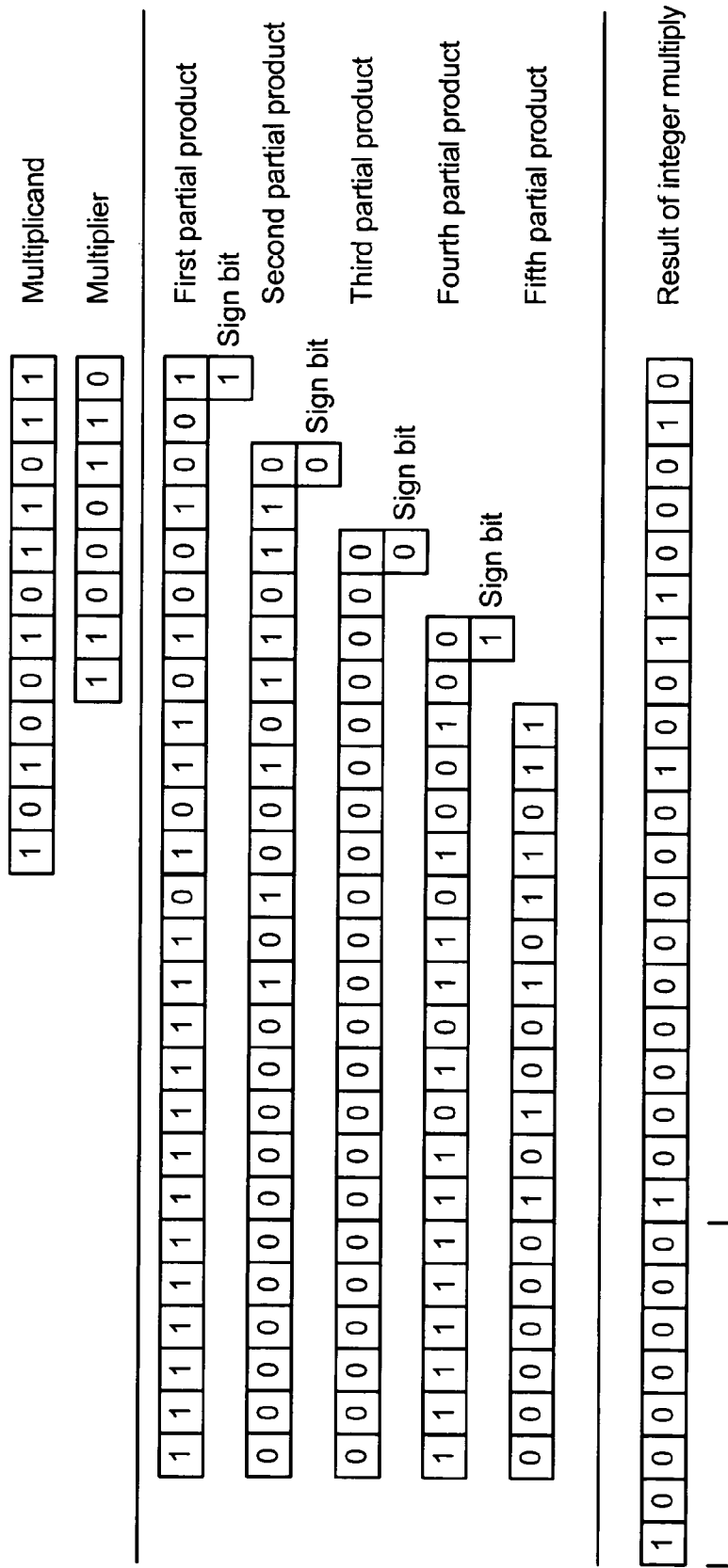

FIG. 4 presents a numeric example of multiplying an 8-bit multiplier by a 12-bit multiplicand using Booth encoding. As shown in FIG. 4, the number of partial products is reduced from 8 to 5. Thus, utilizing Booth encoding can reduce the amount of circuit needed to implement the multiplier execution unit and increase the speed of multiplication. As is known in the art, the above partial product values can be quickly generated by a multiplexer and inversion. There are several methods, known to those skilled in the art, of dealing with the sign bits of the partial products in multipliers that utilize Booth encoding. Each of these methods can be accommodated in fast multipliers.

Figure 5:
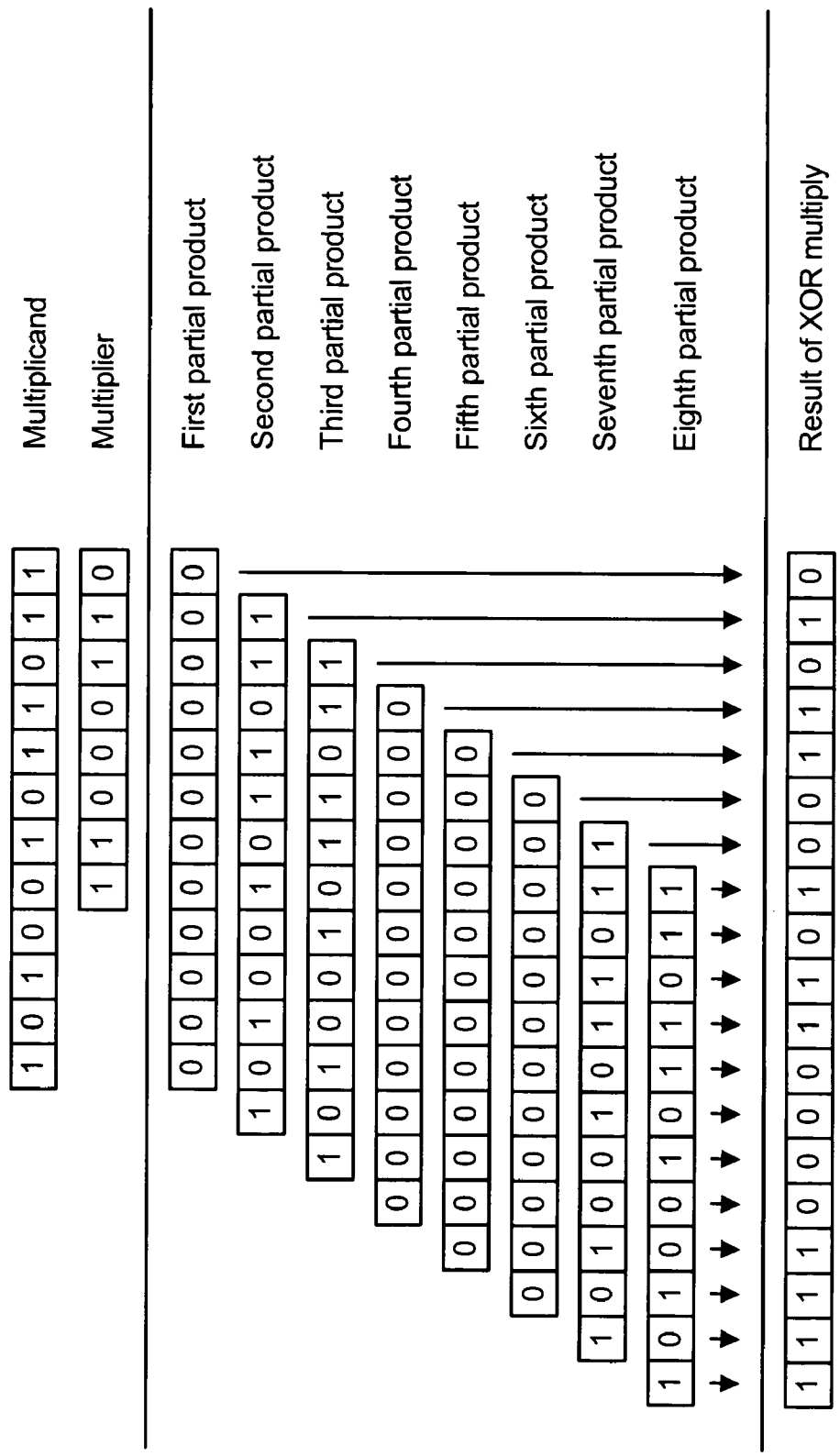

An integer multiplication treats each row of a partial product as a binary representation of the integer multiplicand 105. Therefore, integer multiplication adds the bits of partial sums. However, another type of multiplication, XOR (exclusive or) multiplication, combines the bits by XORing (instead of adding) the bits. In other words, XOR multiplication treats each row of a partial product as a bit string, and the bits along a vertical column of the partial products are XORed together to obtain the result. FIG. 5 presents a numeric example of an XOR multiplication of an 8-bit multiplier and a 12-bit multiplicand.

XOR multiplication is utilized in the implementation of the arithmetic operations for the binary polynomial field in Elliptic Curve Cryptography (ECC). Elliptic curves have been found to provide versions of public-key cryptographic methods that, in some cases, are faster and use smaller keys than other cryptographic methods, while providing an equivalent level of security.

Thus, a need exists for a multiply execution unit, which can efficiently perform traditional multiplication as well as XOR multiplication. By enabling one execution unit to perform both types of multiplications, much less circuit is needed to implement one such combined unit compared to two separate units, one for integer and another for XOR. This helps reduce the power consumption of the multiplier execution unit as well as the area of the computer chip.

3. SUMMARY OF THE INVENTION

One embodiment of the invention is a multiply execution unit that can generate the integer product of a multiplicand and a multiplier and is also operable to generate the XOR product of the multiplicand and the multiplier. The multiply execution unit includes a summing circuit for summing a plurality of partial products. The summing circuit includes a plurality of rows. The summing circuit can generate an integer sum of the plurality of partial products and can generate an XOR sum of the plurality of partial products. The summing circuit includes a plurality of compressors in the first row of the summing circuit. Each of the plurality of compressors has more than three inputs that receive data, a carry output, and a sum output.

4. BRIEF DESCRIPTION OF THE FIGURES

FIG. 1A presents the longhand multiplication of a multiplicand and a multiplier.

FIG. 1B presents a numerical example of the longhand multiplication of a multiplicand and a multiplier.

FIG. 2 presents a prior art carry save adder column.

FIG. 3 presents a prior art full adder.

FIG. 4 presents the integer multiplication of a multiplicand and a multiplier using Booth encoding.

FIG. 5 presents the longhand XOR multiplication of a multiplicand and a multiplier.

Figure 6:
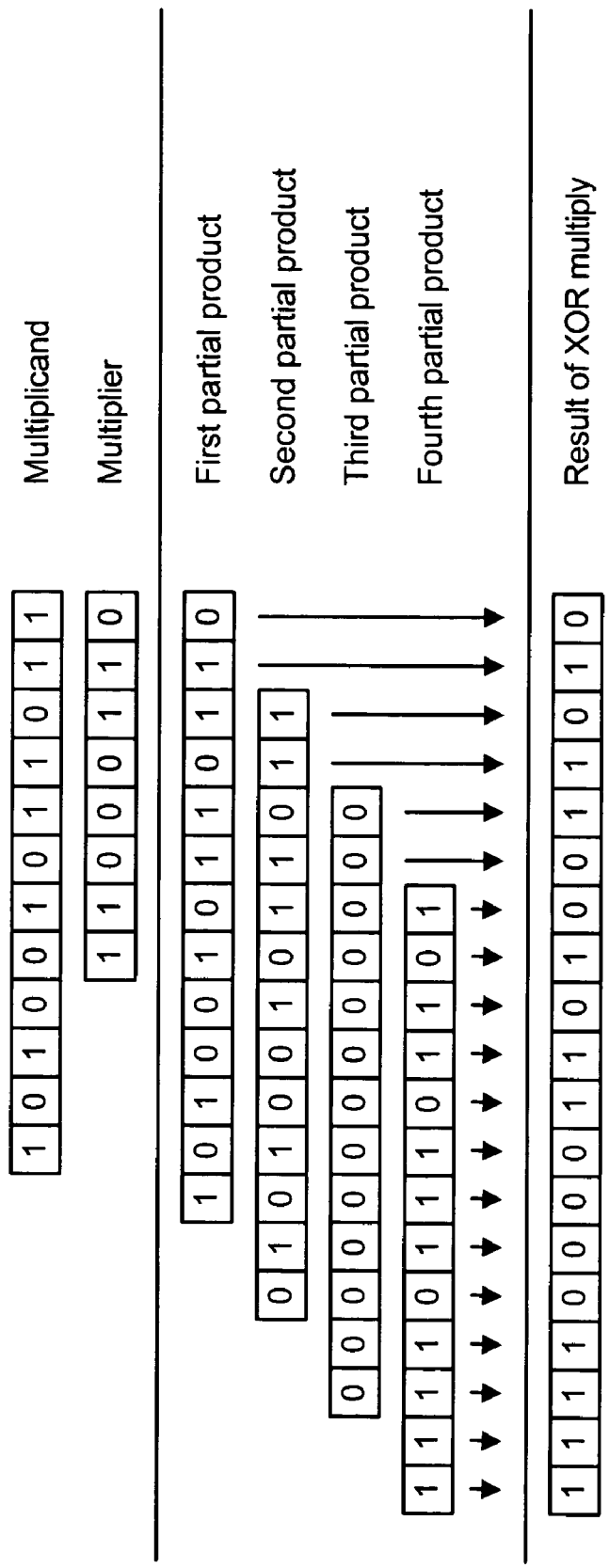

FIG. 6 presents the XOR multiplication of a multiplicand and a multiplier using Booth encoding.

Figure 7:
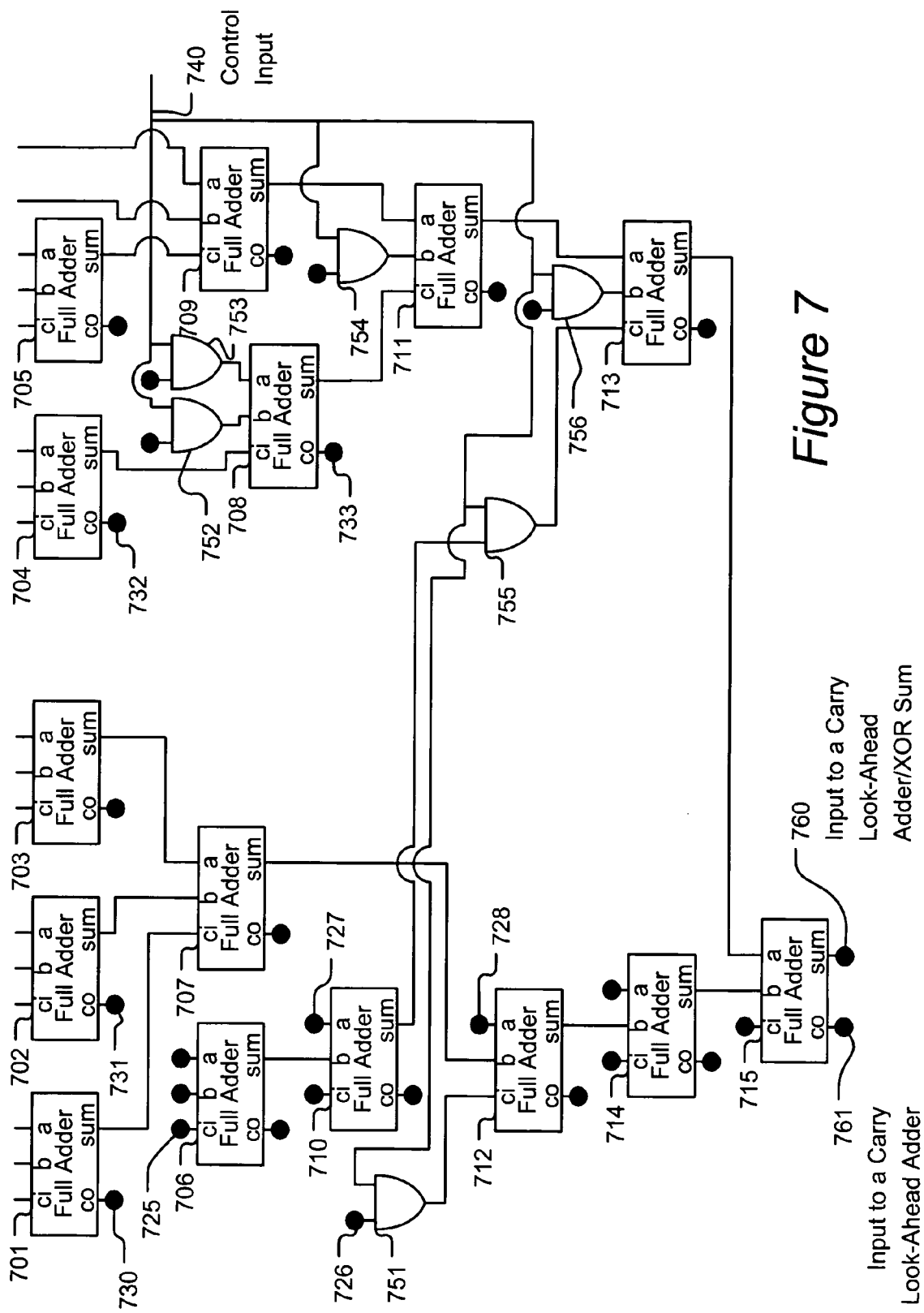

FIG. 7 presents a carry save adder column that can generate integer sums and XOR sums.

Figure 8:
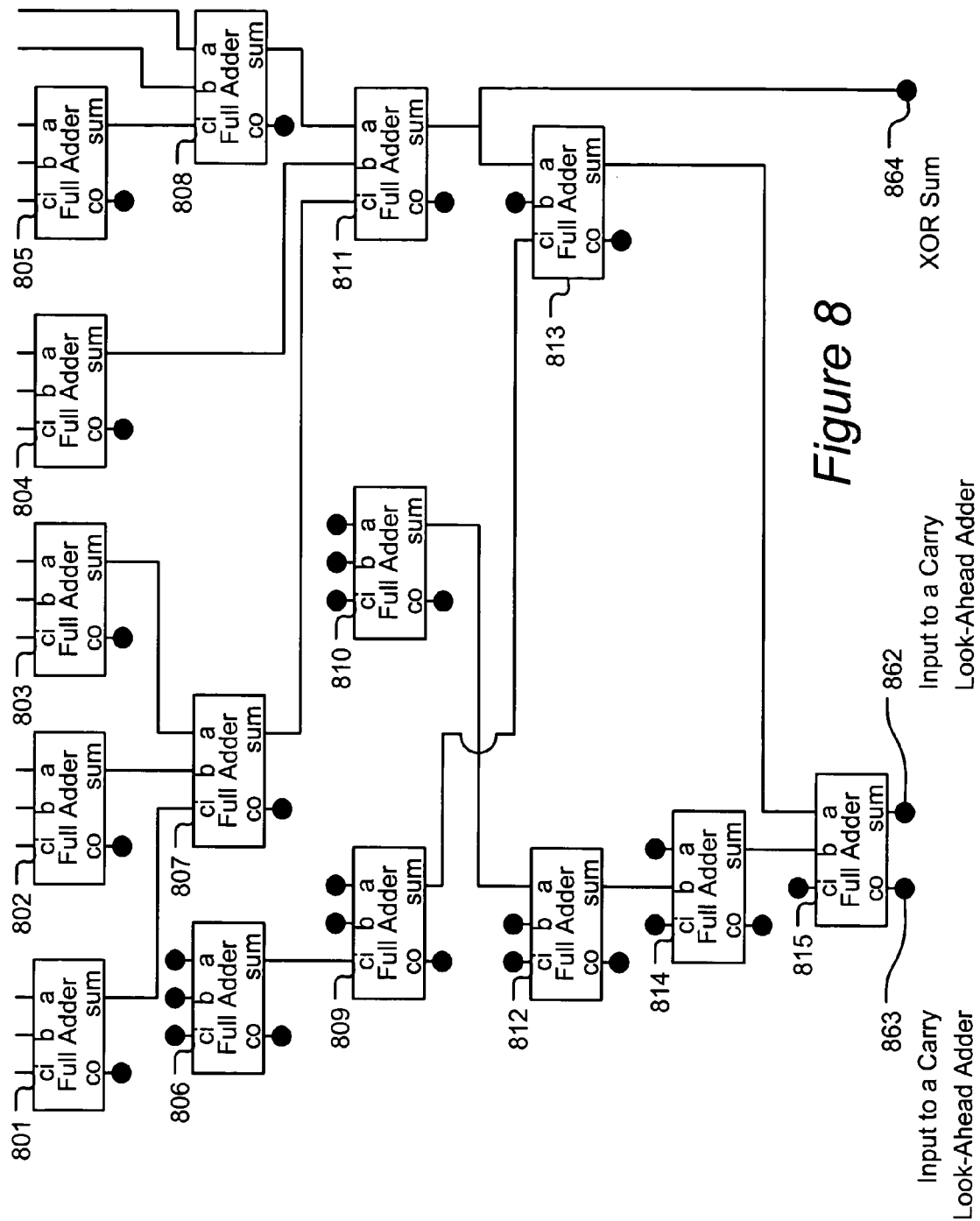

FIG. 8 presents a carry save adder column that can simultaneously generate integer sums and XOR sums.

Figure 9:
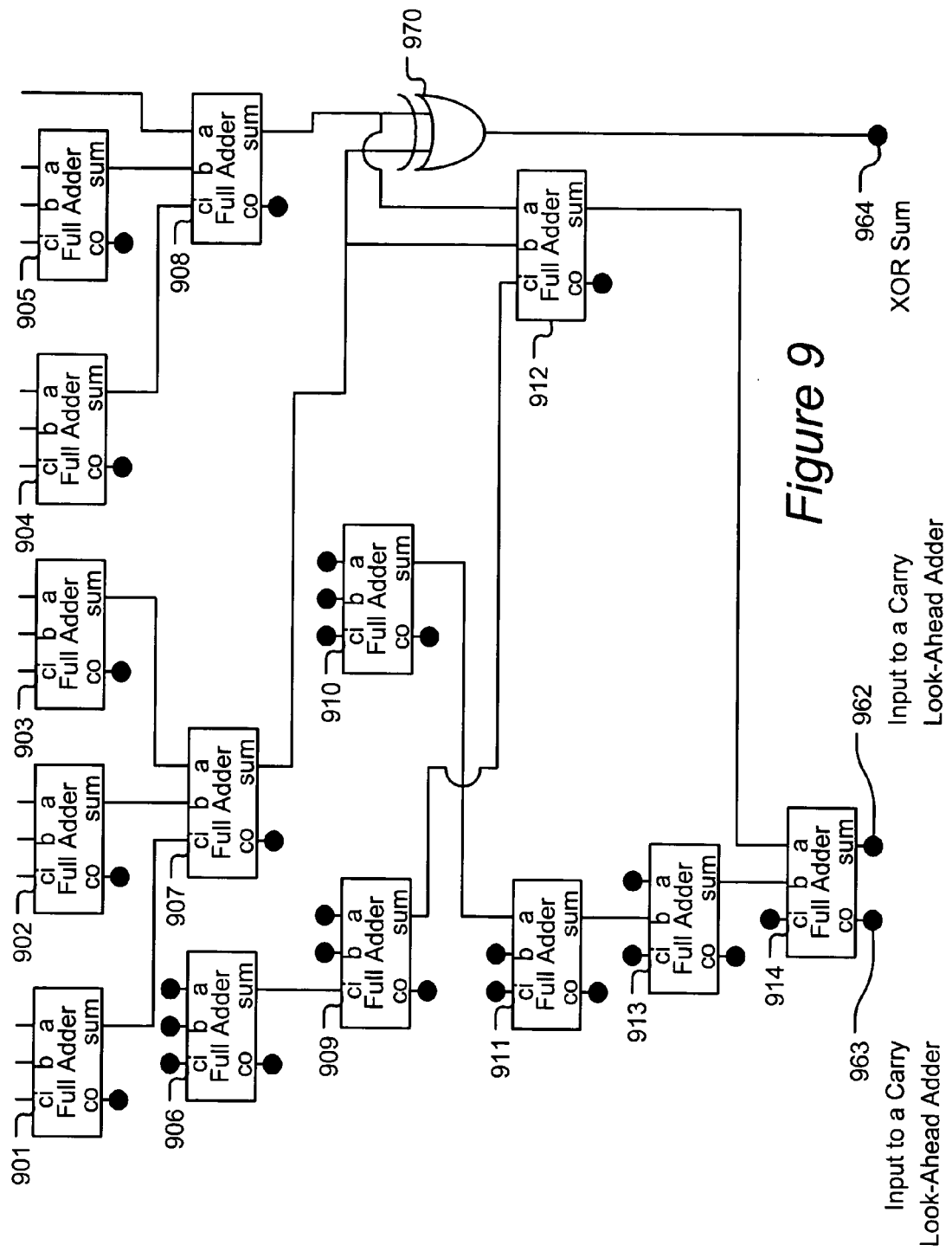

FIG. 9 presents a carry save adder column that can simultaneously generate integer sums and XOR sums of sixteen partial products.

Figure 10:
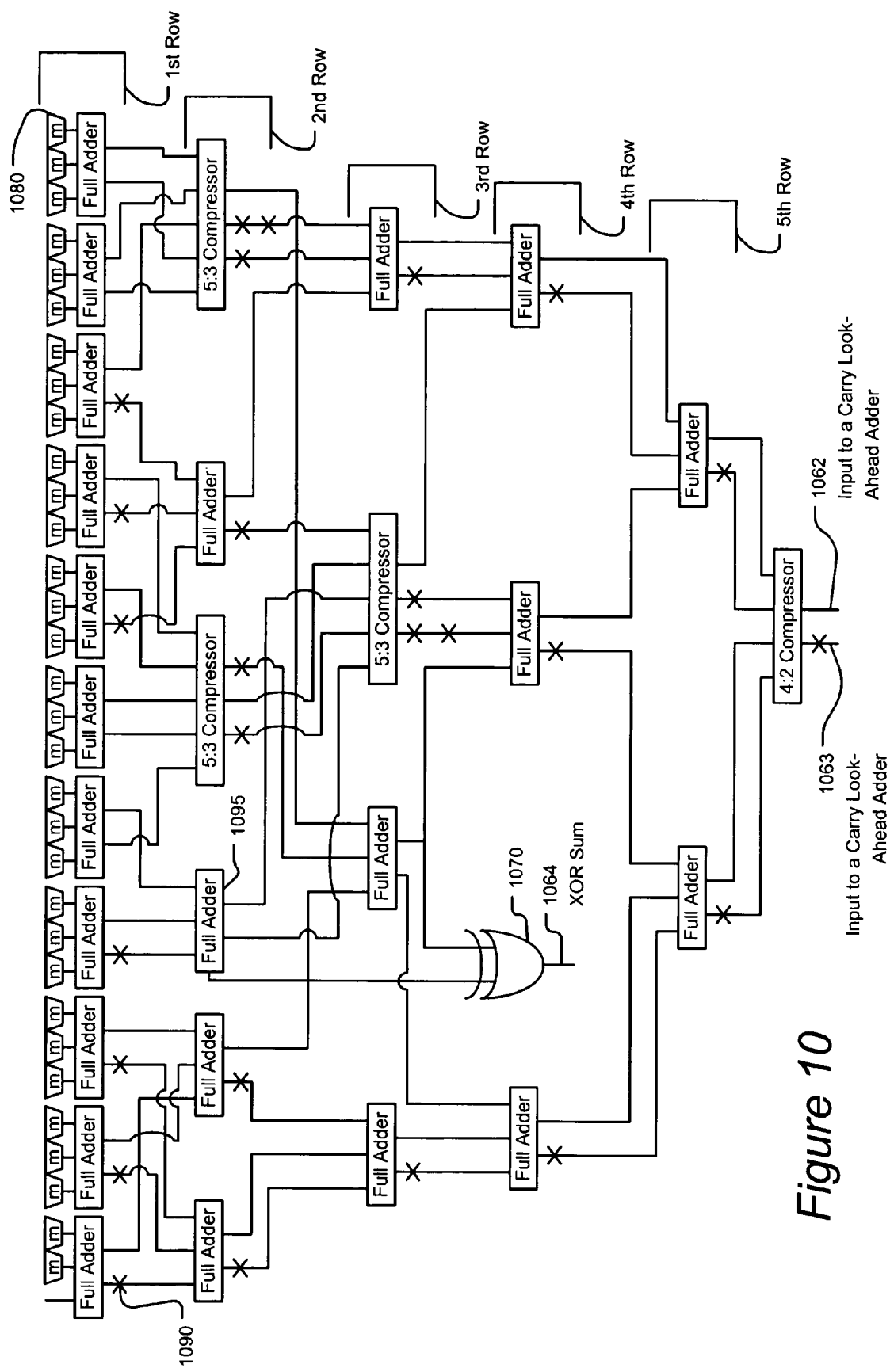

FIG. 10 presents a carry save adder column that sums 33 Booth encoded partial product bits.

Figure 11:
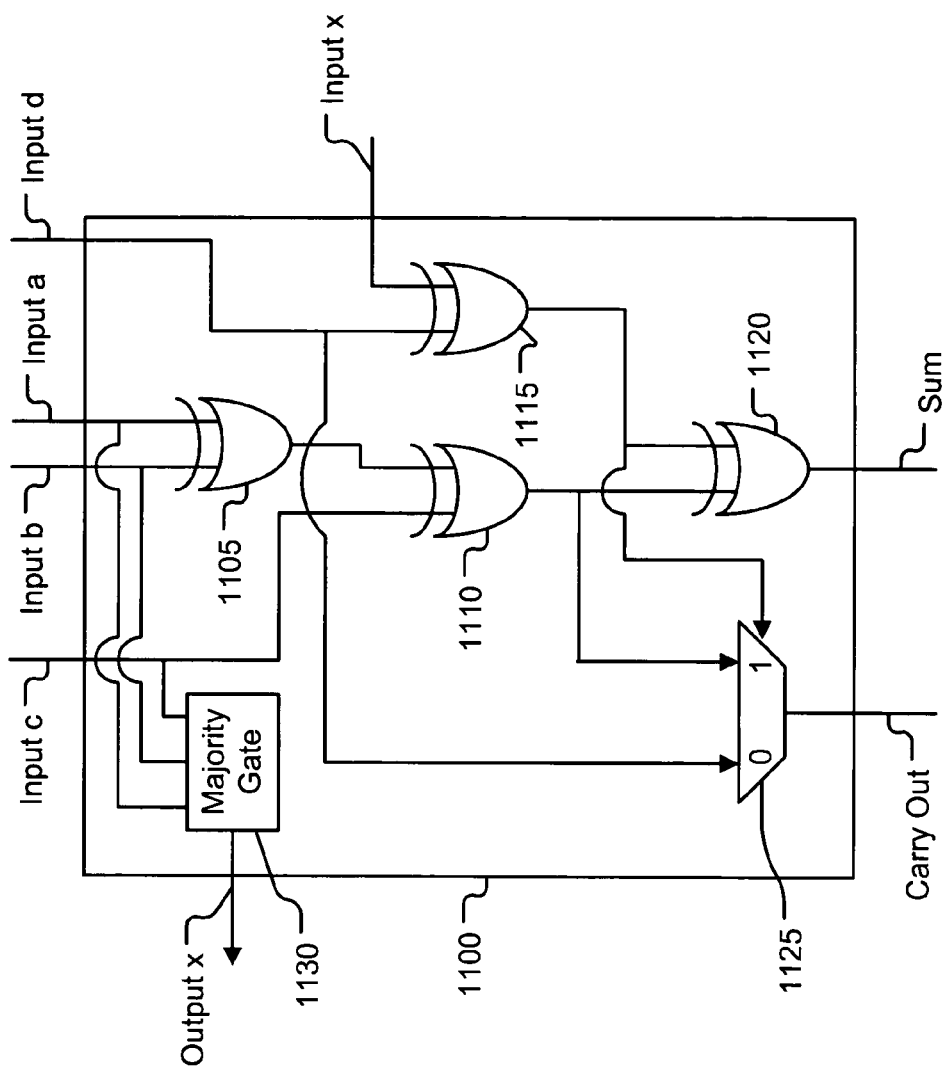

FIG. 11 presents a diagram of a 4:2 compressor.

Figure 12:
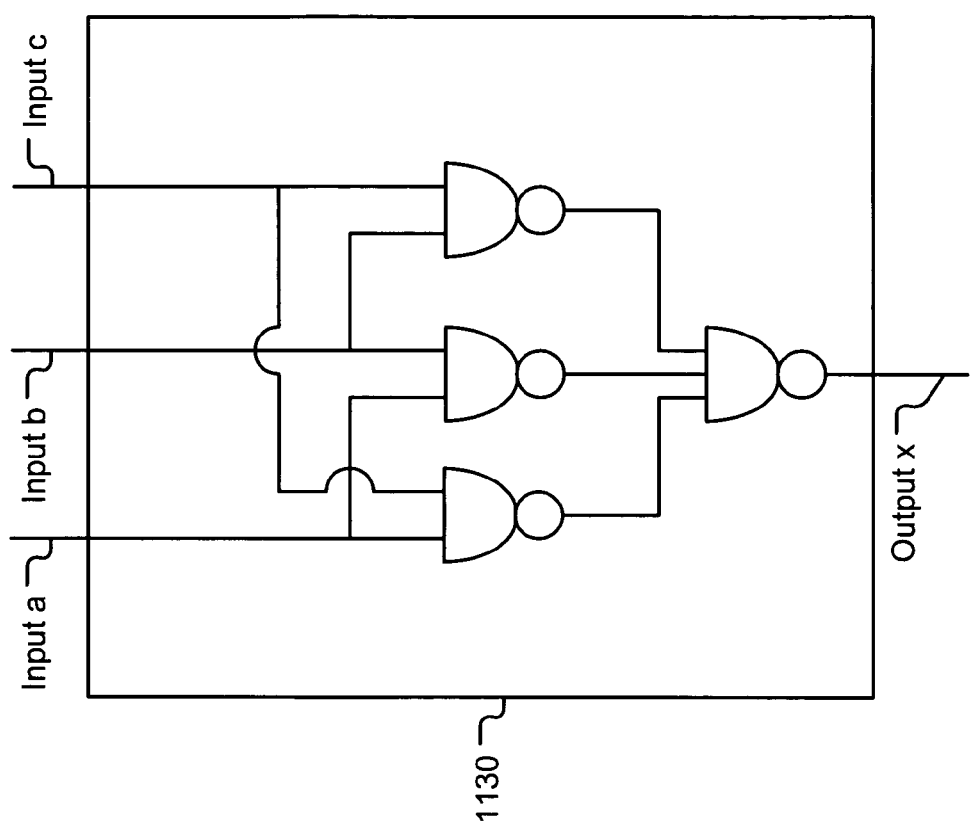

FIG. 12 presents a diagram of a majority gate.

Figure 13:
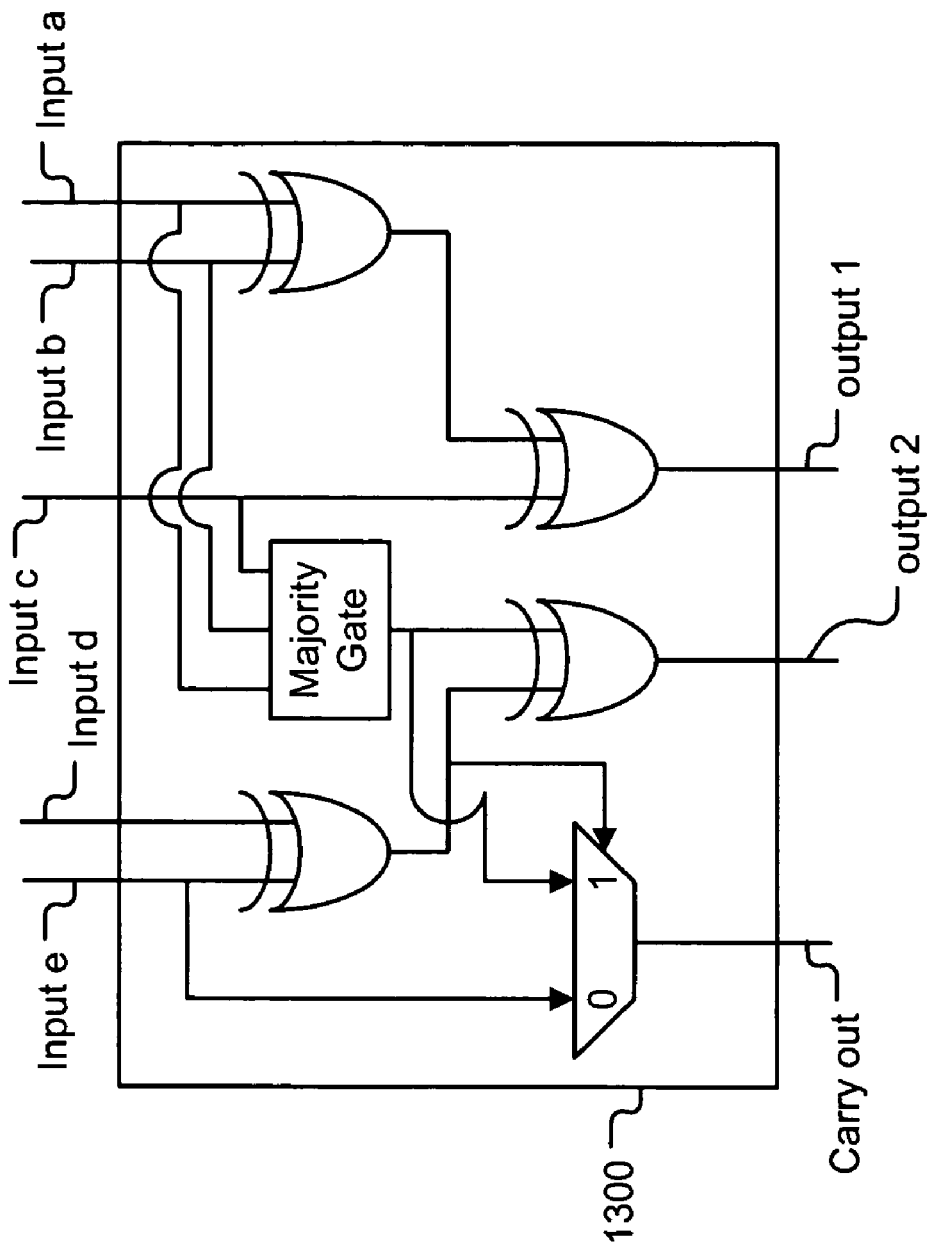

FIG. 13 presents a diagram of a 5:3 compressor.

Figure 14:
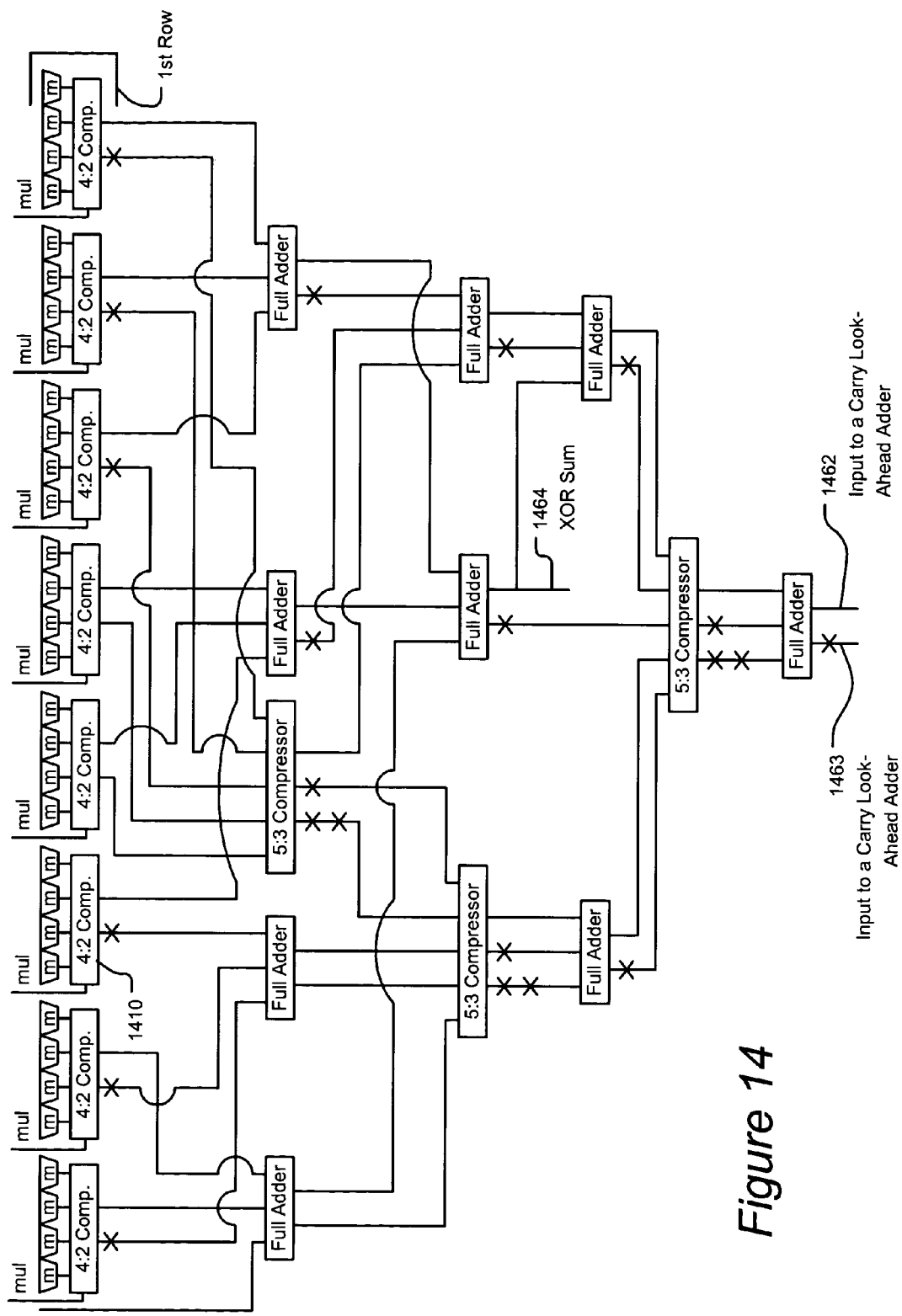

FIG. 14 presents a diagram of a carry save adder column that utilizes 4:2 compressors in the first row.

Figure 15:
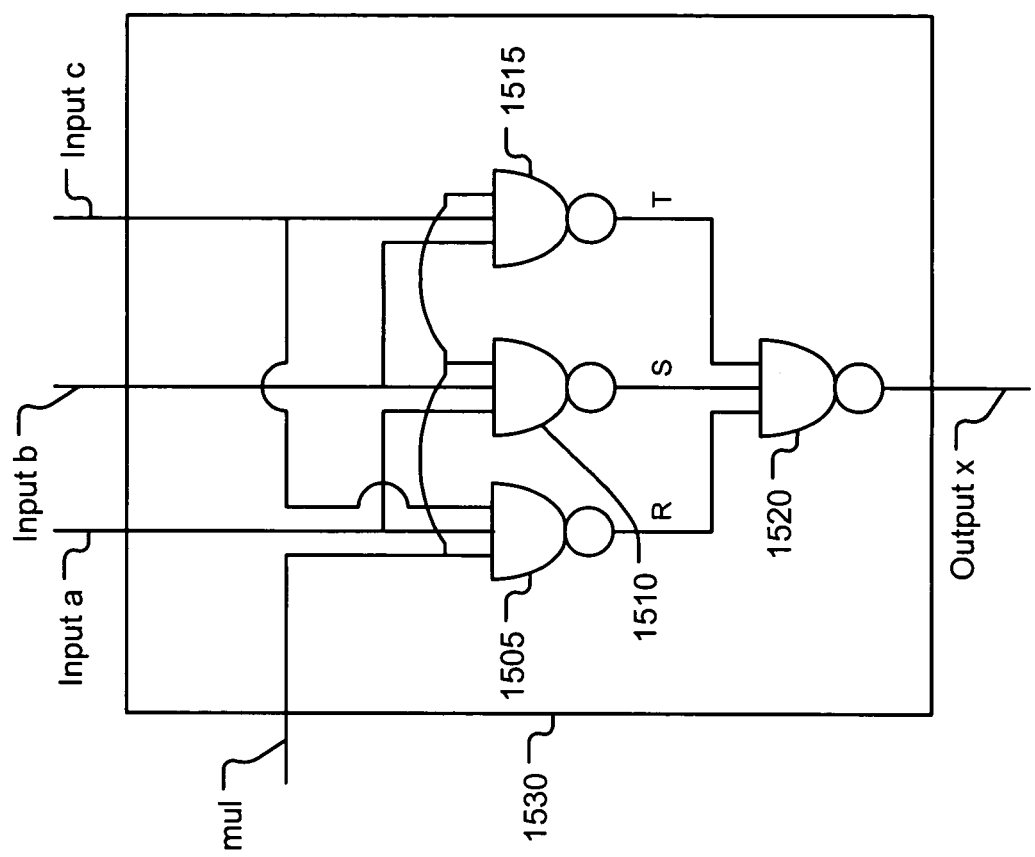

FIG. 15 presents another diagram of a majority gate.

Figure 16:
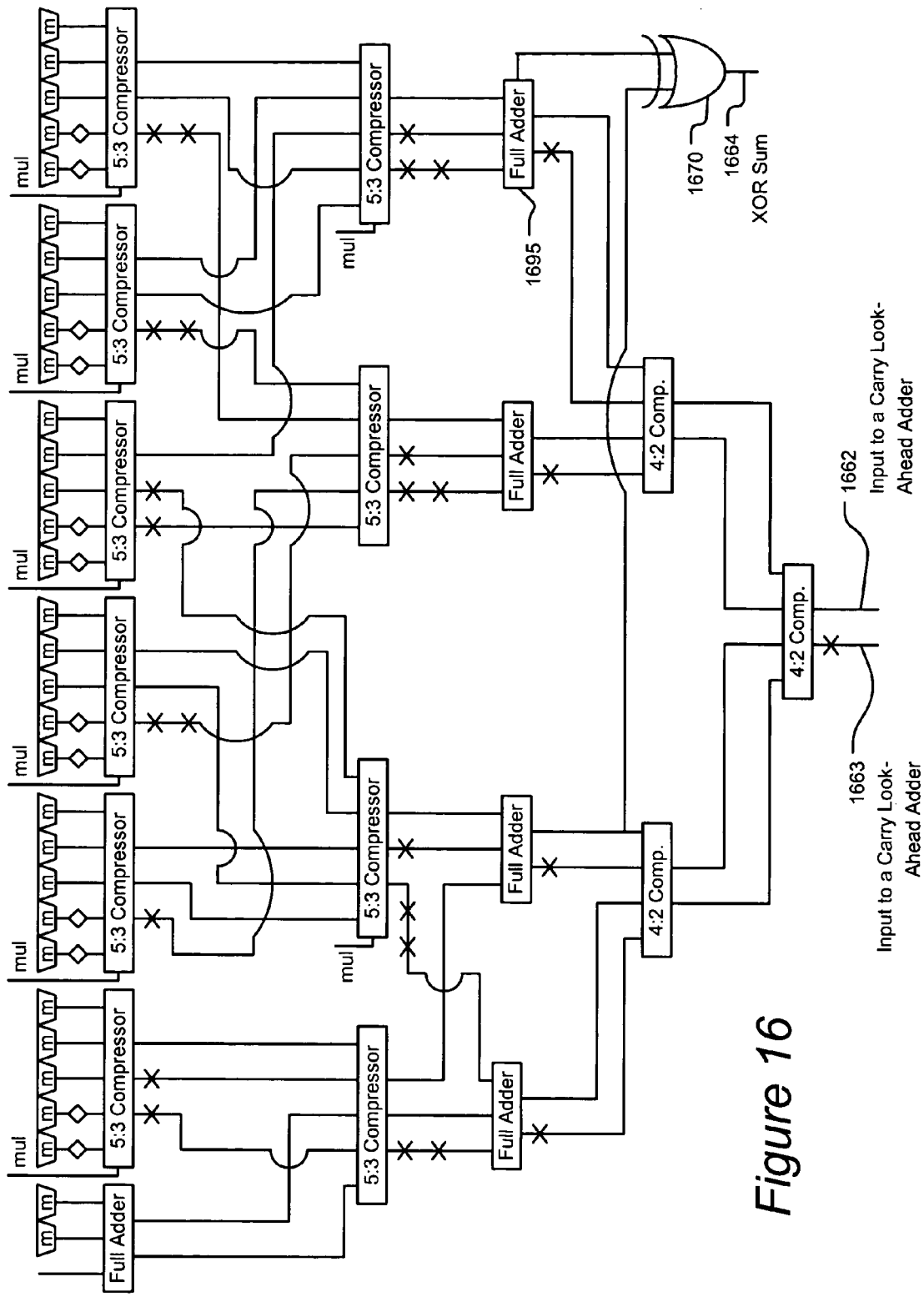

FIG. 16 presents a diagram of a carry save adder column that utilizes 5:3 compressors in the first and second rows.

Figure 17:
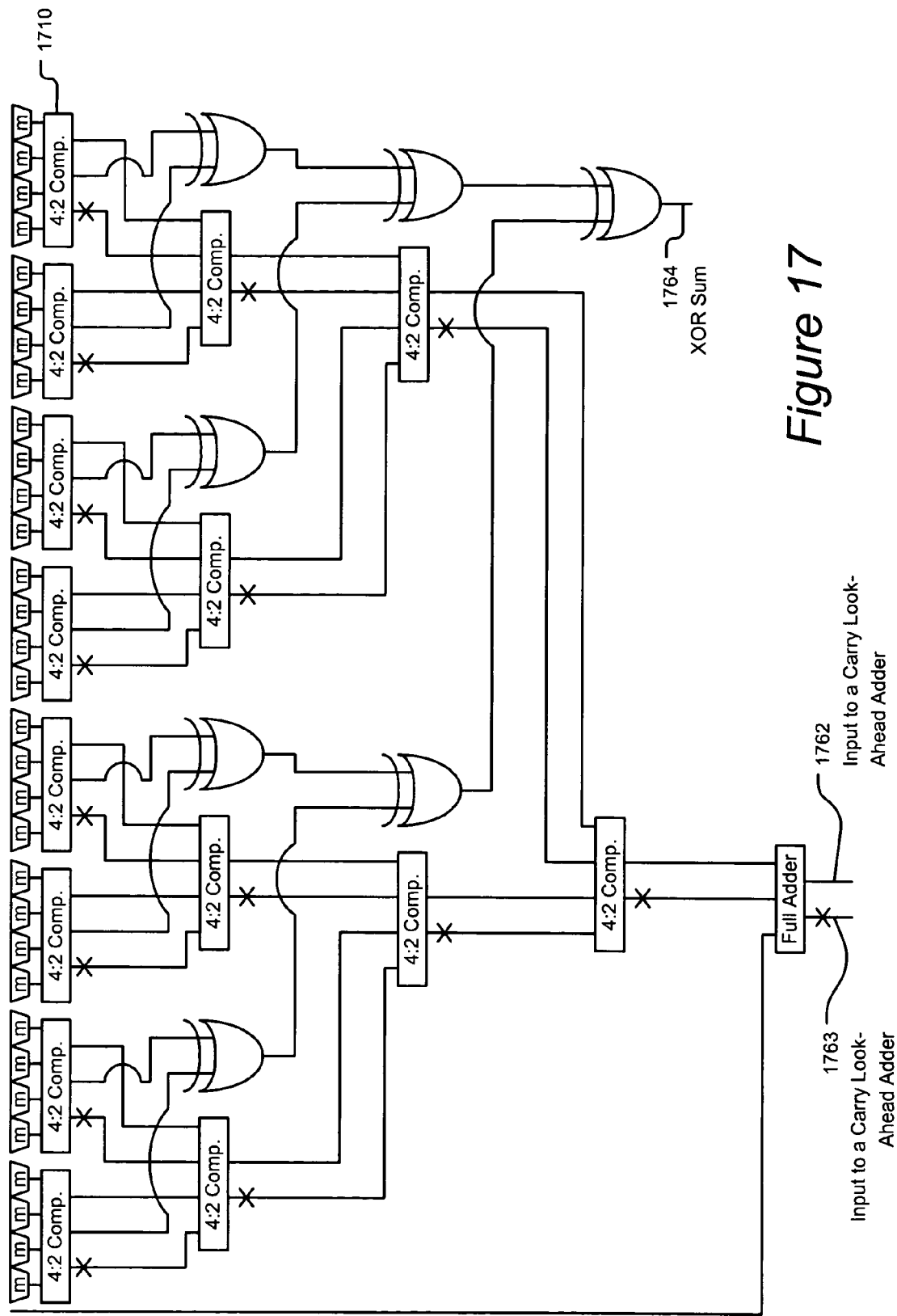

FIG. 17 presents a carry save adder column that utilizes 4:2 compressors, which do not include majority gates, in the first row.

Figure 18:
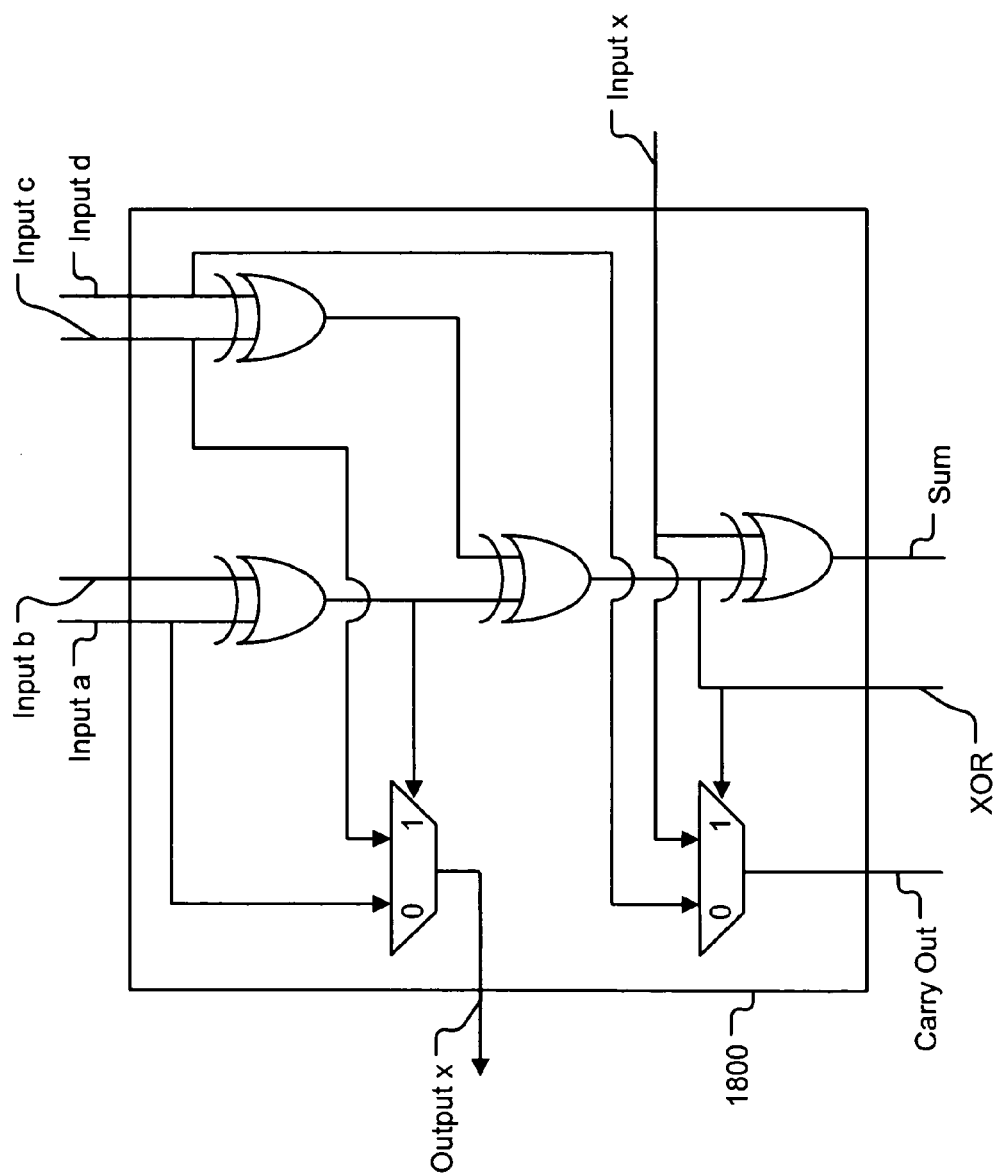

FIG. 18 presents a diagram of a 4:2 compressor that does not include a majority gate.

Figure 19:
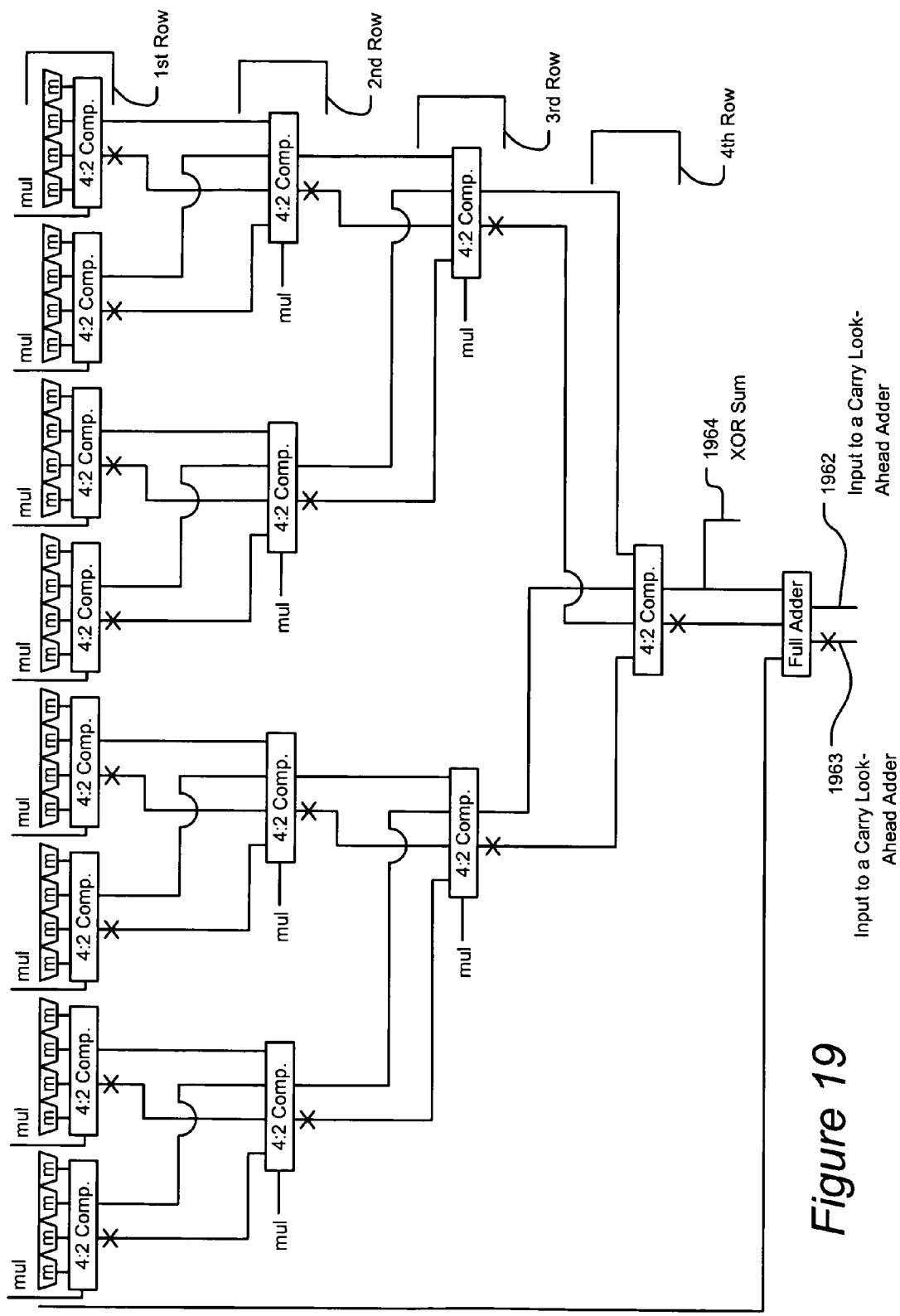

FIG. 19 presents a carry save adder column that utilizes three different types of 4:2 compressors.

Figure 20:
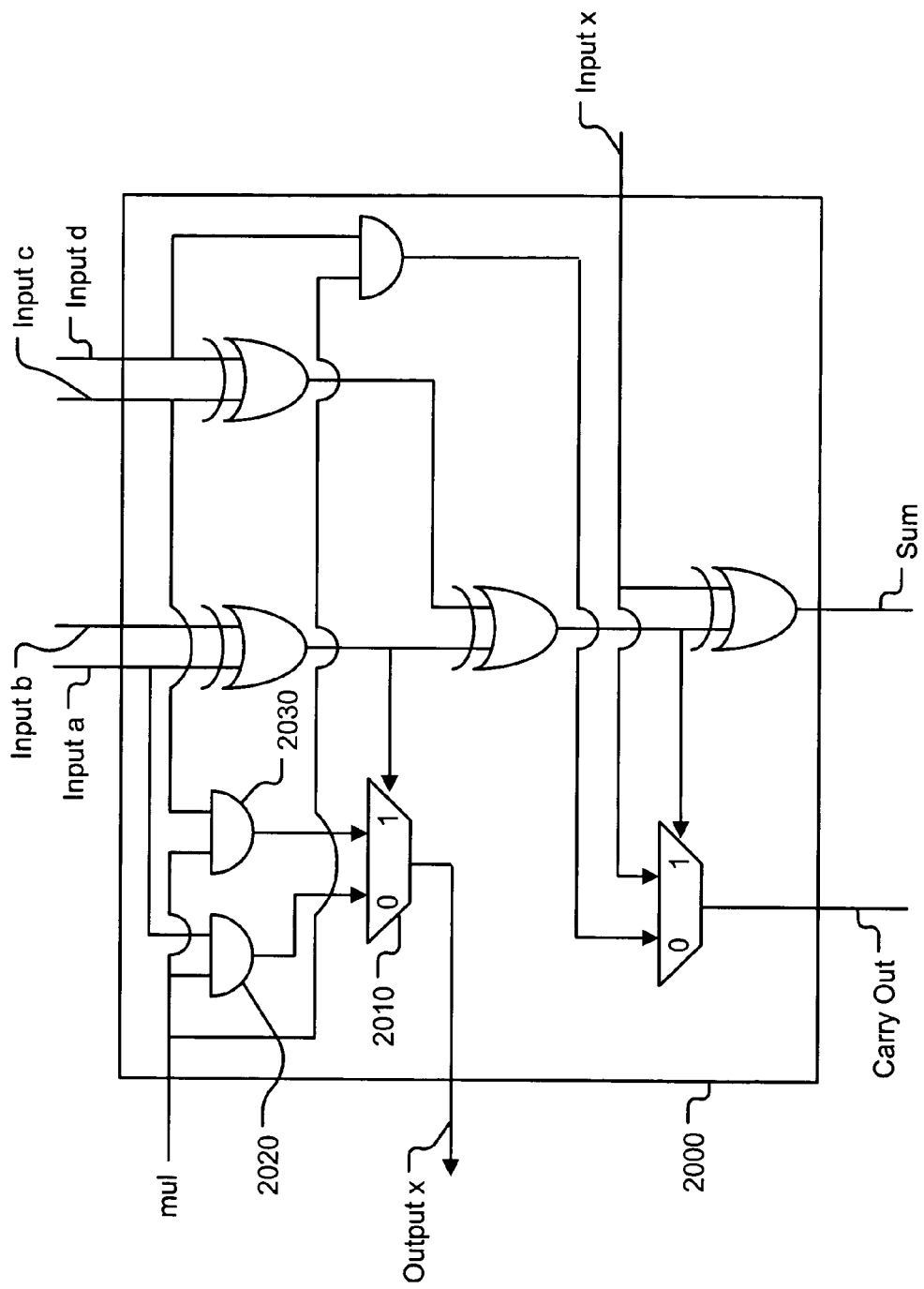

FIG. 20 presents a diagram of a 4:2 compressor.

Figure 21:
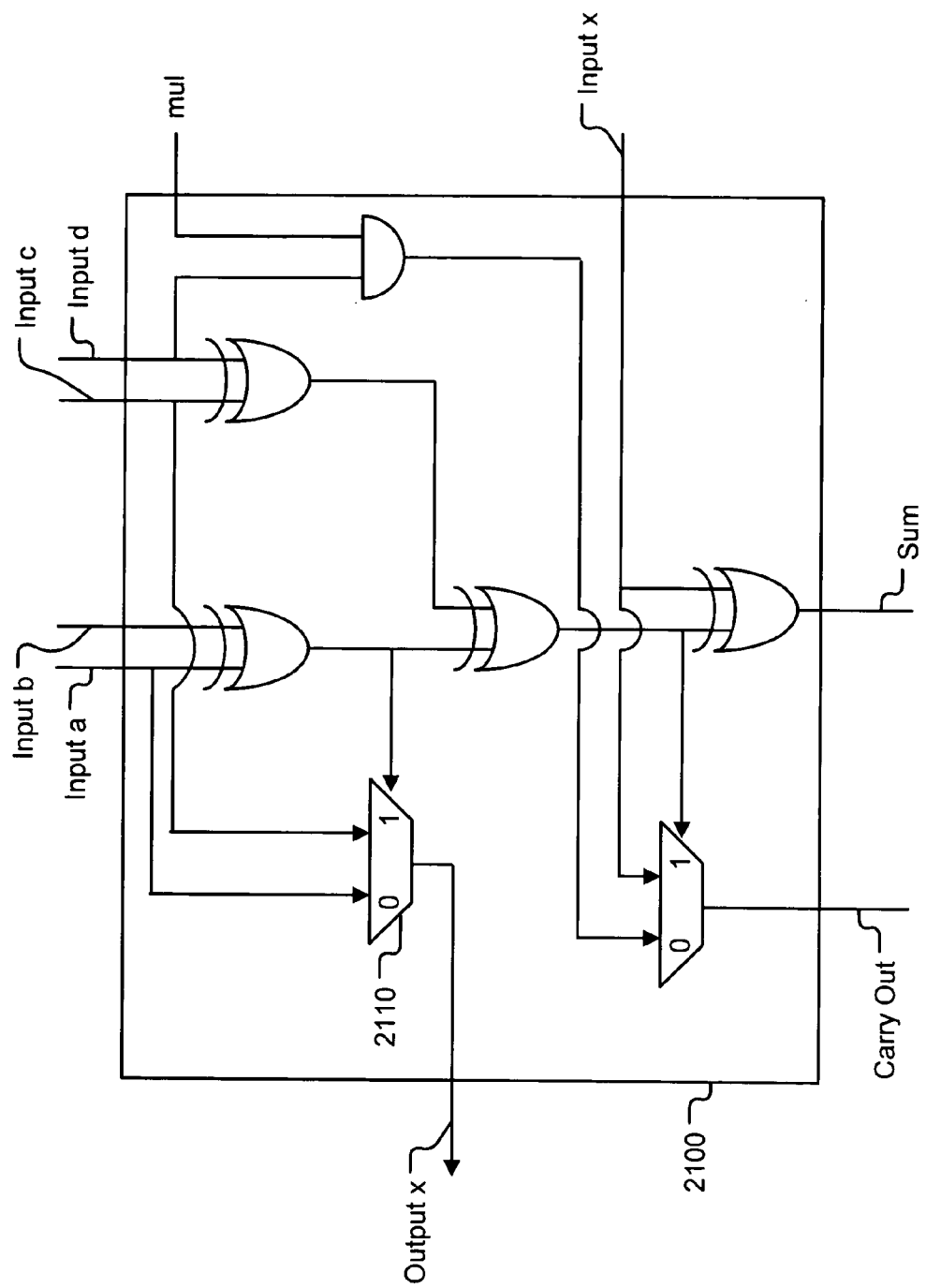

FIG. 21 presents another diagram of a 4:2 compressor.

Figure 22:
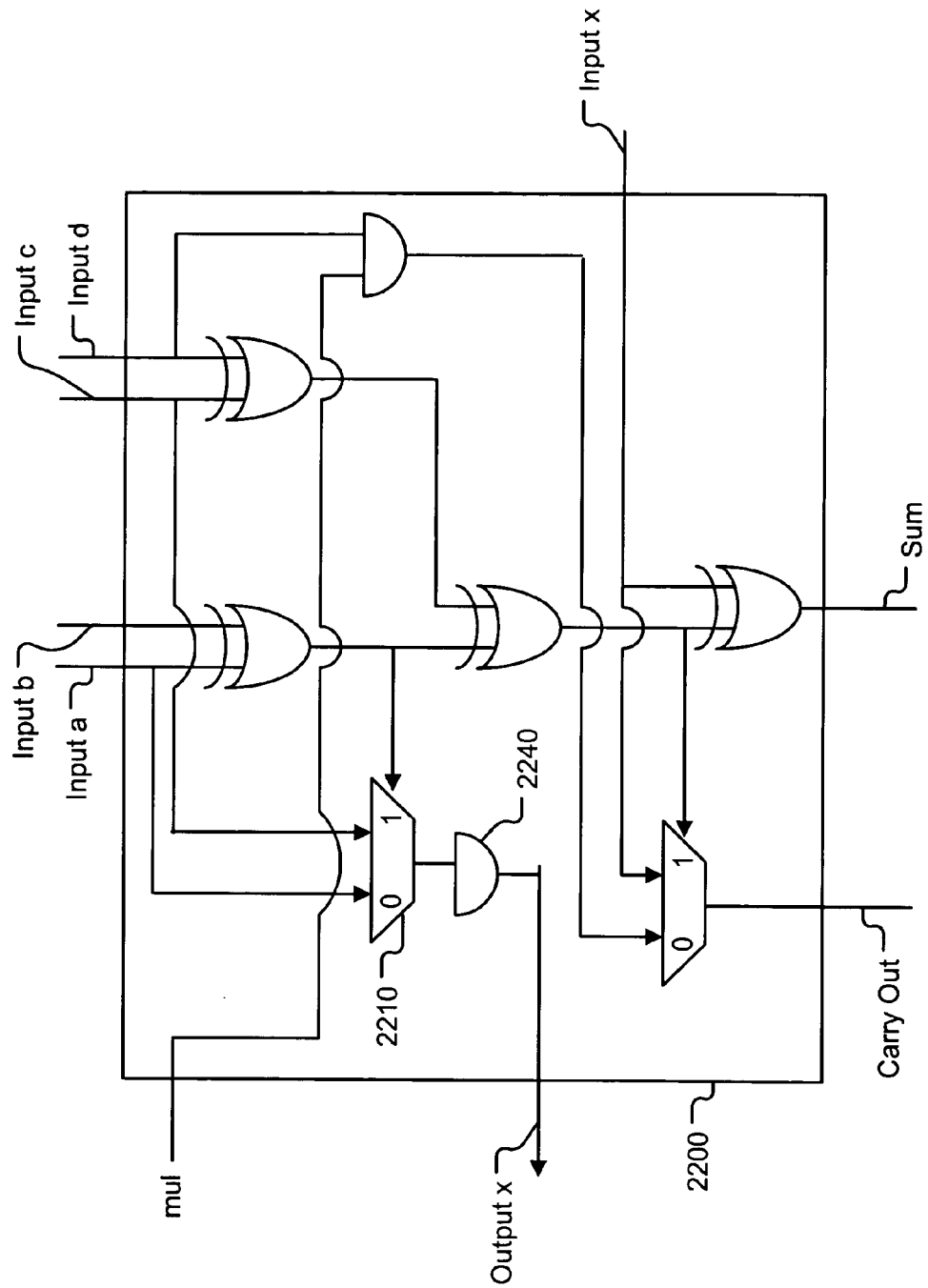

FIG. 22 presents yet another diagram of a 4:2 compressor.

Figure 23:
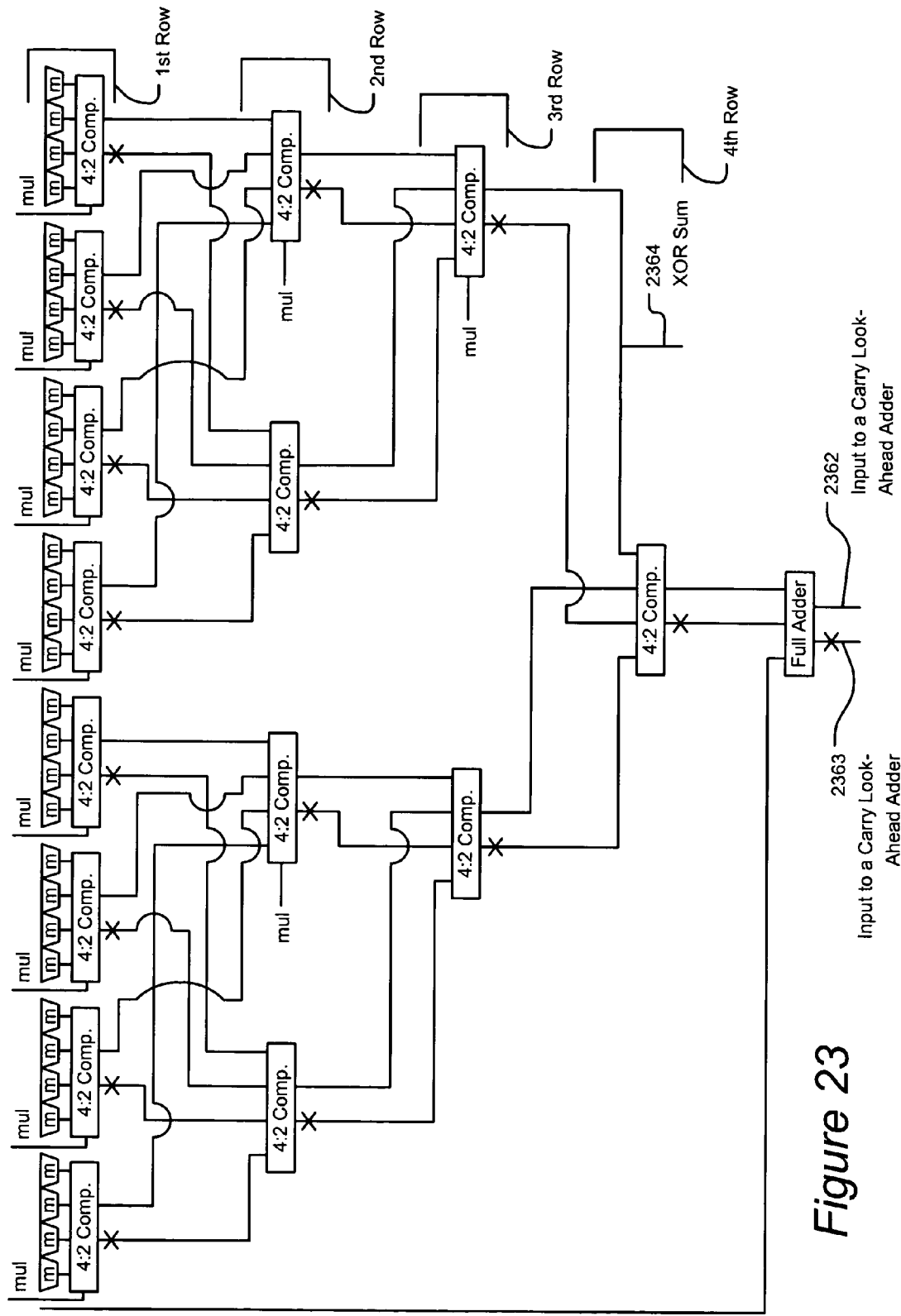

FIG. 23 presents another carry save adder column that obtains the XOR sum earlier than the integer sum.

5. DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

5.1 UTILIZING BOOTH ENCODING TO GENERATE AN XOR PRODUCT

One embodiment of the invention is a fast multiply execution unit that generates an XOR product using Booth encoding. This fast multiply execution unit generates a partial product for each pair of the multiplier's bits. For example, the fast multiply execution unit could generate the partial products shown in the following table:

| 2 Bits | Partial Product Value |
|---|---|
| 00 | 0 |
| 01 | 1 * multiplicand |
| 10 | 2 * multiplicand |
| 11 | multiplicand XOR (2 * multiplicand) i.e., (XOR of the multiplicand and the multiplicand, left-shifted 1 bit) |

A numerical example of XOR multiplying an 8-bit multiplier and a 12-bit multiplicand using Booth encoding is shown in FIG. 6. As shown in FIG. 6, the first two bits of the multiplier are "10." Thus, the first partial product can be generated by copying the left-shifted multiplicand. Similarly, the third and fourth bits of the multiplier are "01." Thus, the second partial product can be generated by copying the multiplicand. The fifth and sixth bits of the multiplier are "00." Thus, the third partial product is zero. The seventh and eighth bits of the multiplier are 11. Thus, the fourth partial product can be generated by XORing the multiplicand and the left-shifted multiplicand. After the generation of the partial products, the partial product columns are XORed. The result is the XOR multiply of the multiplicand and the multiplier.

As shown in FIG. 6, there are only four partial products. Thus, using Booth encoding, only half as many partial products as were generated in FIG. 5 are needed. As a result, the XOR result can be obtained with a smaller circuit. In addition, because the above method does not require any additions and does not propagate any carry bits, the XOR result can be rapidly calculated. Because the generation of the partial products can be performed in parallel, the time to generate the partial products can be just slightly longer than the time to XOR the partial product columns. However, since there are fewer partial products to be combined to obtain the XOR result, the total time to obtain the XOR result is faster.

One may utilize 4 input multiplexers to quickly generate each bit of each partial product. Thus, in one embodiment of the invention, the fast multiply execution unit would include a multiplexer that receives the following values: 0; multiplicand; 2* multiplicand; and multiplicand XOR (2* multiplicand). By using a separate multiplexer to generate each bit of each partial product, the partial products can be generated in parallel.

5.2 UTILIZING BOOTH ENCODING TO GENERATE AN INTEGER PRODUCT OR AN XOR PRODUCT

Another embodiment of the invention is a fast multiply execution unit that generates an integer product or an XOR product using Booth encoded partial products. This fast multiply execution unit generates a partial product for each pair of bits in the multiplier. For example, the fast multiply execution unit could generate the partial products shown in the following table:

| 2 Bits | MSB of Previous Two Bits | Integer Multiply | Partial Product Value |
|---|---|---|---|
| 00 | 0 | 1 | 0 |
| 00 | 0 | 0 | 0 |

-continued

| 2 Bits | MSB of Previous Two Bits | Integer Multiply | Partial Product Value |
|---|---|---|---|
| 01 | 0 | 1 | 1 * multiplicand |
| 01 | 0 | 0 | 1 * multiplicand |
| 10 | 0 | 1 | −2 * multiplicand |
| 10 | 0 | 0 | +2 * multiplicand |
| 11 | 0 | 1 | −1 * multiplicand |
| 11 | 0 | 0 | multiplicand XOR (2 * multiplicand) |
| 00 | 1 | 1 | 1 * multiplicand |
| 00 | 1 | 0 | 0 |
| 01 | 1 | 1 | 2 * multiplicand |
| 01 | 1 | 0 | 1 * multiplicand |
| 10 | 1 | 1 | −1 * multiplicand |
| 10 | 1 | 0 | +2 * multiplicand |
| 11 | 1 | 1 | 0 |
| 11 | 1 | 0 | multiplicand XOR (2 * multiplicand) |

In the above table, a zero in the Integer Multiply column indicates that an XOR multiply is to be performed and a one indicates that an integer multiply is to be performed.

Some embodiments of the invention utilize 6 input multiplexers to rapidly generate each bit of each of the plurality of partial products. Thus, in some embodiments of the invention, the fast multiply execution unit would include a multiplexer that receives the following values: −2* multiplicand; multiplicand; 0; multiplicand; 2* multiplicand; and multiplicand XOR (2* multiplicand). By using a separate multiplexer to generate each bit of each partial product, the partial products can be generated in parallel.

5.3 MULTIPLY EXECUTION UNIT THAT CAN GENERATE INTEGER AND XOR PRODUCTS

Another embodiment of the invention is another multiply execution unit that can operate in a first mode, which can generate integer products of a multiplicand and a multiplier, and can operate in a second mode, which can generate XOR products of a multiplicand and a multiplier. The multiply execution unit contains circuitry that, when in the first mode, adds partial products, and, when in the second mode, XORs partial products. A partial example of such circuitry is the carry save adder column as shown in FIG. 7.

The carry save adder column shown in FIG. 7 is similar to the carry save adder column of FIG. 2 in that it contains fifteen full adders and can rapidly sum the seventeen partial product bits of column 125 (FIG. 1A). However, the carry save adder column of FIG. 7 also includes a control input 740. When control input 740 is set to a high logic state, the carry save adder column operates in a first mode that adds the partial product bits. When control input 740 is set to a low logic state, the carry save adder column operates in a second mode that combines the partial product bits by XORing the bits. Thus, in the second mode, the carry output bits are not used.

Referring to FIG. 7, the control input 740 is coupled to six AND gates 751-756. These AND gates control whether carry bits are allowed to propagate. When control input 740 is set to a high logic state, the AND gates 751-756 allow carries to propagate from one carry save adder column to another. However, when control input 740 is set to a low logic state, then all the AND gates 751-756 output a low logic state regardless of the value of the carry bits. As is evident from FIG. 7, output 733 is sent to input 728 in the next higher carry save adder column. Since this output is known to be zero when performing an XOR multiply, there is no need to place an AND gate before input 728.

While some embodiments of the invention could control the propagation of all carry bits, some embodiments of the invention only control the propagation of certain carry bits. For example, the carry save adder column of FIG. 7 only controls the propagation of the carry bits that can be non-zero and are subsequently combined with a sum bit that is used to produce the XOR sum, which is also passed to the carry look-ahead adder. By controlling the propagation of only these carry bits, an integer multiplier can be efficiently adapted to generate either the inputs 760 and 761, which are input into a carry look-ahead adder, or an XOR multiply result 760. As result, there is no need for a separate XOR summing circuit. Thus, significant die space of a multiply execution unit can be saved.

5.4 MULTIPLY EXECUTION UNIT THAT CAN SIMULTANEOUSLY GENERATE INTEGER AND XOR SUMS

While the carry save adder column shown in FIG. 7 can be utilized to generate integer multiply results and XOR multiply results, the addition of the AND gates 751-756 slows down the generation of the integer multiply. As shown in FIG. 8, the full adders in a carry save adder column can be rearranged to eliminate the need for AND gates such as AND gates 751-756.

As does the carry save adder column of FIG. 7, the carry save adder column shown in FIG. 8 contains fifteen full adders 801-815 and can rapidly sum the seventeen partial product bits of column 125 (FIG. 1A). However, instead of generating either the inputs to a carry look-ahead adder, which are utilized to generate the integer sum, or the XOR sum of partial product bits, the carry save adder column of FIG. 8 can simultaneously generate both the inputs 862 and 863, which are utilized to input to a carry look-ahead adder to generate the integer sum, and the XOR sum 864 of the partial product bits.

As shown in FIG. 8, the carry save adder column can generate both sums simultaneously because the value of the XOR sum 864 is based only upon the sum outputs of full adders that are not affected by the propagation of carry bits. Thus, the XOR sum 864 is independent of the value of any carry output in the carry save adder column. In other words, the carry save adder column of FIG. 8 does not combine carry bits with bits that are used to generate the XOR sum 864. Therefore, the value of the XOR sum 864 is independent of whether any carry bits are propagated.

Referring to FIG. 8, all the inputs of full adders 801-805 receive partial product bits. Thus, the sum outputs of these full adders 801-805 are independent of the propagation of any carry bit. Thus, the sum outputs of these full adders 801-805 are independent of the value of any carry output in the summing circuit.

Referring again to FIG. 8, all the inputs of full adder 807 are coupled to the sum output of full adders 801, 802 and 803. Because the sum outputs of full adders 801, 802 and 803 are not affected by the propagation of any carry bits, the sum output of full adder 807 is likewise not affected by the propagation of any carry bits. As can be seen in FIG. 8, the sum output of full adder 808 is also not affected by the propagation of any carry bits. Similarly, full adder 811, which inputs are coupled to the sum outputs of full adders 804, 807 and 808, is not affected by the propagation of any carry bits. As a result, the XOR sum 864 is not affected by the propagation of any carry bit from another carry save adder column. Thus, sum output of full adders 807, 808, and 811 are independent of the value of any carry output in the summing circuit.

While the XOR sum 864 is based only upon the sum outputs of the group of full adders 801-805, 807, 808, and 811 that are not affected by the propagation of carry bits, the integer sum bits 862 and 863 are based upon those full adders and also full adders which inputs are affected by the propagation of carry bits. As shown in FIG. 8, the inputs of full adders 806, 809, 810, 812, 813, 814, and 815 are all coupled to nodes that receive carry outputs from other carry save adder columns. Thus, the sum outputs of those full adders 806, 809, 810, 812, 813, 814 and 815 are affected by the propagation of carry bits. For example, the inputs of full adder 806 all receive carry bits from other carry save adder columns. Thus, the sum output of full adder 806 is affected by whether such carry bits are propagated or not.

As shown in FIG. 8, the carry input of full adder 809 is coupled to the sum output of full adder 806, which is affected by the carry bits of full adders 801, 802, and 803 from the next lower carry save adder column. Thus, the sum output of full adder 809 would also be affected by the propagation of carry bits. As a result, the sum outputs of these full adders 806, 809, 810, 812-815 are dependent on the value of at least one carry output bit in the summing circuit.

5.5 SUMMING AN EVEN NUMBER OF PARTIAL PRODUCT BITS

The carry save adder column shown in FIG. 8 sums seventeen partial product bits. If the number of partial product bits is even, then a two-input XOR gate can be utilized to obtain the XOR sum. A carry save adder column that sums 16 partial product bits is shown in FIG. 9. This carry save adder column utilizes a single two-input XOR gate 970 to generate XOR sum 964. In other embodiments, such as shown in FIG. 17, additional XOR gates can be utilized to generate the XOR sum. Thus, in such embodiments, the output of one XOR gate could be coupled to the input of another XOR gate, the output of which would be the XOR sum.

5.6 SUMMING A LARGER NUMBER OF PARTIAL PRODUCT BITS

The above-discussed techniques can be utilized to sum a large number of partial product bits. For example, FIG. 10 presents a carry save adder column that sums 33 Booth encoded partial product bits. Such a circuit could be utilized in a 64 bit×64 bit multiplier. Other embodiments of the invention (not shown) sum 64 Booth encoded partial product bits.

The "m" boxes in FIG. 10, such as "m" box 1080, are Booth encoding multiplexers. The "X"s in FIG. 10, such as "X" 1090, indicate the signal above the "X" is sent to the corresponding position in the next higher carry save adder column. Similarly, the signal below the "X" is received from the corresponding position in the immediately previous carry save adder column.

The carry save adder column shown in FIG. 10 contains a 4:2 compressor. A diagram of a 4:2 compressor 1100 is shown in FIG. 11. As shown in FIG. 11, the 4:2 compressor 1100 includes four XOR gates 1105, 1110, 1115, and 1120. In addition, the 4:2 compressor 1100 includes a multiplexer 1125 and a majority gate 1130. The majority gate 1130 can be implemented with a plurality of NAND gates as shown in FIG. 12.

The carry save adder column also contains a plurality of 5:3 compressors. A diagram of a 5:3 compressor 1300 is shown in FIG. 13. The 5:3 compressor 1300 includes a plurality of XOR gates, a multiplexer and a majority gate. The majority gate can be implemented with a plurality of NAND gates as shown in FIG. 12. Output x of a 4:2 compressor is coupled to the input x of the corresponding 4:2 compressor in the next higher carry save adder column.

The carry save adder column also contains a number of full adders, such as shown in FIG. 3. One of the full adders, full adder 1095, includes an extra output. This output is produced by the output of XOR gate 310 (FIG. 3). Thus, as can be determined from FIG. 3, the output of XOR gate 310 is not affected by the Carry In input.

In the carry save adder column shown in FIG. 10, all signal paths that contribute to the XOR result do not include any carry-outs from any compressor, whether a full adder (a 3:2 compressor), a 4:2 compressor or a 5:3 compressor.

5.7 UTILIZING 5:2 AND 5:3 COMPRESSORS IN THE FIRST ROW OF CARRY SAVE ADDER COLUMNS

Another embodiment of the invention is a carry save adder column that includes a plurality of 4:2 compressors in the first row of the carry save adder column. This carry save adder column efficiently calculates XOR sums and integer sums. A diagram of such a carry save adder column is shown in FIG. 14. Note that the 4:2 compressors in the first row, such as 4:2 compressor 1410, include an additional input, the mul input. The mul input is set to "0" when an XOR sum is desired. Similarly, the mul input is set to "1" when an integer sum is desired. The majority gate of 4:2 compressor 1410, which receives the mul input, is configured to produce a zero output when calculating an XOR sum and a traditional majority output when calculating an integer sum.

A block diagram of the majority gate of 4:2 compressor 1410 is shown in FIG. 15. As can be determined from FIG. 15, the output of NAND gate 1505, which is labeled "R," equals ¬(input a & input c & mul input). Similarly, the output of NAND gate 1510, which is labeled "S," equals ¬(input b & input a & mul input) and the output of NAND gate 1515, which is labeled "T," equals ¬(input C & input b & mul input). Similarly, the output of NAND gate 1520, which is the output of the majority gate 1530 is equal to ¬(R & S & T). Thus, when mul input is set to "0," for an XOR multiply, "X" will be "0." However, when mul input is set to "1" for an arithmetic multiply, then the value of X will not be affected by the mul input and thus will produce the same result as shown in FIG. 12.

Majority gate 1530 can also be utilized in 5:3 compressors. As a result, a carry save adder column that calculates XOR sums and integer sums can be constructed with 5:3 compressors in its first row. A diagram of such a carry save adder column is shown in FIG. 16. The diamonds in between the Booth encoding multiplexers and the 5:3 compressors in FIG. 16 indicate that the signal input into the diamond goes to the corresponding position in the previous carry save adder column and the signal output from the diamond is from the corresponding position in the next higher carry save adder column.

Note that the carry save adder column of FIG. 16 includes two types of 5:3 compressors. Some of the 5:3 compressors include a mul input while others do not include a mul input. If all five inputs to a 5:3 compressor are in the signal path of the XOR sum, then the 5:3 compressor includes a mul input and a majority gate that functions as the majority gate of FIG. 15. However, if only the three least significant inputs into a 5:3 compressor are in the signals path of the XOR sum, then a conventional majority gate, which does not include a mul input, can be utilized.

By utilizing 5:3 compressors, carry save adder columns can execute faster than carry save adder columns that utilize only full adders and 4:2 compressors.

5.8 AN ALTERNATIVE EMBODIMENT OF A CARRY SAVE ADDER COLUMN UTILIZING 4:2 COMPRESSORS IN THE FIRST ROW

While the 4:2 compressors in the first row of FIG. 14 include a majority gate, carry save adder columns can utilize 4:2 compressors in the first row that do not include majority gates. One such carry save adder column is shown in FIG. 17. A diagram of the 4:2 compressor 1710 of FIG. 17 is shown in FIG. 18.

Because the XOR gates in FIG. 17 are approximately three times as fast as the 4:2 compressors, the XOR result 1764 is available much earlier than the two results 1762 and 1763 that are sent to the carry look-ahead adder. Thus, the XOR gates can be made much smaller (and hence slower) because the XOR gates are not in the critical path. As a result, considerable die area can be saved.

5.9 OTHER EMBODIMENTS OF A CARRY SAVE ADDER COLUMN

FIG. 19 shows a carry save adder column that utilizes three different types of 4:2 compressors. The 4:2 compressors in the first row of FIG. 19 are configured as shown in FIG. 20. When mul input is equal to "0," these 4:2 compressors output the XOR of the four inputs, a "0" on the carry output, and a "0" on output x. As can be determined from FIG. 20, input a and input c are both zeroed when performing an XOR multiply before they reach multiplexer 2010. Similarly, when performing an XOR multiply, input x is "0" thus the value of "0" is XORed with the XOR of input a, input b, input c, and input d. In addition, to ensure that the carryout is "0," when performing an XOR multiply, input d is zeroed.

The 4:2 compressors in the second and third rows of FIG. 19 can be configured as shown in FIG. 21. The 4:2 compressor of FIG. 21 is similar to the compressor of FIG. 20 except that the compressor of FIG. 21 does not include AND gates 2020 and 2030. These AND gates are not needed because, during an XOR multiply, the carry outputs from the first row of compressors is "0." The sum outputs of the previous row are input into the 4:2 compressors of the second and third rows via their input c and input d ports. Similarly, the two carry outputs from the first row compressors are input into the input a and input b ports. Thus, there is no need to include AND gates 2020 and 2030 to zero the multiplexer 2110 inputs. AND gates 2030 and 2030 are not needed if the two carry outputs from the previous row of 4:2 compressors are input into any two of the three inputs (input a, input b and input c) because the carry outputs from the previous row are known to be zero.

Similarly, if either input a or input b together with input d were known to be zero, then a 4:2 compressor could be constructed that did not include the AND gate of FIG. 21 and instead included an AND gate placed between input c and multiplexer 2110. This AND gate could be utilized to zero input c when mul input is zero. Still another embodiment of a 4:2 compressor would not include the AND gate of FIG. 21 but would include an AND gate placed between the output of multiplexer 2110 and the output x port. This AND gate could be utilized to zero output x when mul input is zero.

If the XOR sum is desired to be obtained from the carry look-ahead adder, then the 4:2 compressor in the fourth row could be similar to the compressor shown in FIG. 20. Otherwise, the sum will change when the carry output is added to the sum output in the carry look-ahead adder.

The mul input in the 4:2 compressor shown in FIG. 20 has a relatively high fanout. This fanout can be reduced by replacing AND gates 2020 and 2030 with a single AND gate 2240 as shown in FIG. 22.

Yet another embodiment of the invention is shown in FIG. 23. The carry save adder column shown in FIG. 23 obtains the XOR sum earlier than prior carry save adder columns. Also, as can be determined from FIG. 23, only two of the 4:2 compressors in the second row and one of the 4:2 compressors in the third row include a mul input. The three compressors can be configured as shown in FIG. 20.

5.10 CONCLUSION

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. For example, carry save adders can be laid out in a triangular shape or can be laid out in a rectangular structure. Similarly, such adders can be manufactured utilizing either standard cells or custom designed cells. Further, full adders can be combined to create 4 to 2 or 5 to 3 compressors. Carry save adders can receive Booth encoded partial products or can receive unencoded partial products. Additionally, the above disclosure is not intended to limit the present invention. The scope of the present invention is defined by the appended claims.

It is claimed:

1. A multiply execution unit that is operable to generate the integer product of a multiplicand and a multiplier and is also operable to generate the XOR product of the multiplicand and the multiplier, the multiply execution unit comprising:
   a summing circuit for summing a plurality of partial products, the summing circuit including a plurality of rows, the summing circuit operable to generate an integer sum of the plurality of partial products and operable to generate an XOR sum of the plurality of partial products, the summing circuit including:
      a plurality of compressors in the first row of the summing circuit, the plurality of compressors each having more than three inputs that receive data, a carry output, and a sum output.

2. The multiply execution unit of claim 1, wherein the plurality of compressors include at least one 4:2 compressor.

3. The multiply execution unit of claim 2, wherein the plurality of compressors include at least one compressor that includes a majority gate that receives an input that indicates whether an XOR sum or an integer sum is to be determined.

4. The multiply execution unit of claim 3, wherein the majority gate includes four NAND gates.

5. The multiply execution unit of claim 3, wherein the majority gate outputs a "0" if an XOR sum is to be determined.

6. The multiply execution unit of claim 2, wherein the plurality of compressors includes at least one compressor that includes an AND gate that receives an input that indicates whether an XOR sum or an integer sum is to be determined.

7. The multiply execution unit of claim 6 wherein the AND gate outputs a "0" if an XOR sum is to be determined.

8. The multiply execution unit of claim 1, wherein the plurality of compressors include at least one 5:3 compressor.

9. The multiply execution unit of claim 8, wherein the plurality of compressors include at least one compressor that includes a majority gate that receives an input that indicates whether an XOR sum or an integer sum is to be determined.

10. The multiply execution unit of claim 9, wherein the majority gate includes four NAND gates.

11. The multiply execution unit of claim 9, wherein the majority gate outputs a "0" if an XOR sum is to be determined.

12. The multiply execution unit of claim 8, wherein the plurality of compressors includes at least one compressor that includes an AND gate that receives an input that indicates whether an XOR sum or an integer sum is to be determined.

13. The multiply execution unit of claim 12, wherein the AND gate outputs a "0" if an XOR sum is to be determined.

14. The multiply execution unit of claim 1, wherein the more than three inputs each receive a signal from a Booth encoder.

15. The multiply execution unit of claim 1, wherein the plurality of compressors include at least one compressor that includes a majority gate that receives an input that indicates whether an XOR sum or an integer sum is to be determined.

16. The multiply execution unit of claim 15, wherein the majority gate includes four NAND gates.

17. The multiply execution unit of claim 15, wherein the majority gate outputs a "0" if an XOR sum is to be determined.

18. The multiply execution unit of claim 1, wherein the summing circuit includes: a second plurality of compressors in the second row of the summing circuit, the second plurality of compressors each having more than three inputs that receive data, a carry output, and a sum output.

19. The multiply execution unit of claim 18, wherein the second plurality of compressors include at least one 4:2 compressor.

20. The multiply execution unit of claim 18, wherein the second plurality of compressors include at least one 5:3 compressor.

21. The multiply execution unit of claim 18, wherein the second plurality of compressors include at least one compressor that includes a majority gate that receives an input that indicates whether an XOR sum or an integer sum is to be determined.

22. The multiply execution unit of claim 21, wherein the majority gate includes four NAND gates.

23. The multiply execution unit of claim 21, wherein the majority gate outputs a "0" if an XOR sum is to be determined.

24. The multiply execution unit of claim 21, wherein the first plurality of compressors and the second plurality of compressors both include at least one 4:2 compressor.

25. The multiply execution unit of claim 21, wherein the first plurality of compressors and the second plurality of compressors both include at least one 5:3 compressor.

26. The multiply execution unit of claim 18, wherein the second plurality of compressors includes at least one compressor that includes an AND gate that receives an input that indicates whether an XOR sum or an integer sum is to be determined.

27. The multiply execution unit of claim 26, wherein the AND gate outputs a "0" if an XOR sum is to be determined.

28. The multiply execution unit of claim 26, wherein the first plurality of compressors and the second plurality of compressors both include at least one 4:2 compressor.

29. The multiply execution unit of claim 26, wherein the first plurality of compressors and the second plurality of compressors both include at least one 5:3 compressor.

30. The multiply execution unit of claim 1, wherein the plurality of compressors includes at least one compressor that includes an AND gate that receives an input that indicates whether an XOR sum or an integer sum is to be determined.

31. The multiply execution unit of claim 30, wherein the AND gate outputs a "0" if an XOR sum is to be determined.

* * * * *